(12) United States Patent
Zhang

(10) Patent No.: US 7,930,319 B2
(45) Date of Patent: Apr. 19, 2011

(54) SEARCH METHOD AND SYSTEM USING THINKING SYSTEM

(76) Inventor: Qin Zhang, Los Angeles, CA (US)

( * ) Notice: Subject to any disclaimer, the term of this patent is extended or adjusted under 35 U.S.C. 154(b) by 359 days.

(21) Appl. No.: 12/317,582

(22) Filed: Dec. 24, 2008

(65) Prior Publication Data

US 2009/0182731 A1 Jul. 16, 2009

Related U.S. Application Data

(60) Provisional application No. 61/010,800, filed on Jan. 10, 2008.

(51) Int. Cl.
*G06F 17/30* (2006.01)
(52) U.S. Cl. ...................................... 707/802; 707/825
(58) Field of Classification Search .................. 707/694, 707/790, 791, 793, 802, 804, 812, 821, 825, 707/826; 706/45, 46
See application file for complete search history.

(56) References Cited

U.S. PATENT DOCUMENTS

| | | | | |
|---|---|---|---|---|
| 4,890,543 A * | 1/1990 | Kudou et al. | ................... | 92/228 |
| 5,159,667 A * | 10/1992 | Borrey et al. | ................. | 715/205 |
| 5,594,837 A * | 1/1997 | Noyes | .............................. | 706/55 |
| 5,787,426 A * | 7/1998 | Koshiba et al. | ........................ | 1/1 |
| 6,810,376 B1 * | 10/2004 | Guan et al. | ........................ | 704/9 |
| 2003/0149934 A1 * | 8/2003 | Worden | ......................... | 715/513 |
| 2004/0073874 A1 * | 4/2004 | Poibeau et al. | ................ | 715/531 |
| 2005/0071150 A1 * | 3/2005 | Nasypny | ............................ | 704/9 |
| 2007/0061487 A1 * | 3/2007 | Moore et al. | .................. | 709/246 |
| 2007/0106754 A1 * | 5/2007 | Moore | .......................... | 709/217 |
| 2008/0005086 A1 * | 1/2008 | Moore | ............................ | 707/3 |

* cited by examiner

*Primary Examiner* — Cam-Linh Nguyen

(57) ABSTRACT

The present invention relates to a system and method for information process using artificially constructed apparatus. More specially, the present invention provides a system and method that can search for information in a document structure and provide precise results by analyzing the inputs and search results using the executing system and the knowledge structure of the think system. In one preferred embodiment of the present invention, the search terms are divided into subject terms and corresponding feature terms, and document entry files comprising respective subject terms and corresponding feature terms will provide access to documents including subject terms and corresponding feature terms.

15 Claims, 6 Drawing Sheets

US 7,930,319 B2

SEARCH METHOD AND SYSTEM USING THINKING SYSTEM

CROSS REFERENCE TO RELATED APPLICATIONS

The present application claims the benefit of and incorporate in full the provisional application entitled "A Thinking System and Method" with Application No. 60/749,808 filed on Dec. 12, 2005, the utility application entitled "Thinking System and Method" with application Ser. No. 11/409,460 filed on Apr. 22, 2006, the provisional application entitled "System and Method for Information Processing and Motor Control" with Application No. 60/958,132 filed on Jul. 2, 2007, the utility application entitled "A System and Method for Information Processing and Motor Control" with application Ser. No. 12/215,108 filed on Jun. 25, 2008, and the provisional application entitled "Search Method and System Using Thinking System" with Application No. 61/010,800 filed on Jan. 10, 2008.

FIELD OF INVENTION

The present invention relates to a system and method for providing a new way of direct information access. More specially, the present invention provides a system and method that can provide information gathering and dissimulation through computer networks using the thinking system.

BACKGROUND OF THE INVENTION

Internet changed our lives. But the information access through Internet still lacks the transparency that can be developed. Accesses to the information through the web are mostly through search engine, where websites containing words or phrases as in search terms will be listed. However, the current search engine cannot understand the relationships between search terms, thus the results can only be stacking of information mixed with irrelevant materials. Upon to now, no searching method can pin point the sources for the information to be obtained. Users need to weed through various websites in order to obtain useful information.

The present invention provides solution of this problem using a language structure and language analysis method of a thinking system. This system and method can be used in any computer systems and networks.

SUMMARY OF THE INVENTION

The search method of the present invention comprising the step of establishing a knowledge structure including a file organizing mechanism, and more than one element files, wherein the element files including identifying information and link information;

establishing a processing structure comprising a process file organizing mechanism, and at least one process file;

establishing a document structure comprising document entry files, document addresses, document contents, and a document organizing mechanism;

establishing an executing system comprising an internal control mechanism and an inputting mode, a reading mode, a thinking mode, a writing mode, a memorizing mode, an outputting mode, an inquiry mode, verification mode, and a system update mode;

wherein the internal control mechanism further comprises internal control rules and structure rules, wherein the internal control rules include basic rules, task rules, and target rules;

establishing a system log;

running the executing system wherein the internal control mechanism can operate constantly, wherein the thinking mode, inquiry mode, memorizing mode, verification mode, and a system update mode can be activated according to the internal control rules of the internal control mechanism not triggered by an input;

if input information is to be received from an inputting device, the internal control mechanism will operate inputting mode according to the internal control rules, wherein the input information will be converted to format conformed with the format requirement by the executing system according to the inputting rules;

once input information is received by the executing system, the internal control mechanism will activate reading mode according to the internal control rules, wherein according to the reading rules, the input will be disseminated into elements and element files of the knowledge structure with corresponding elements matched with the input elements will be located and loaded into the executing system (or areas easily accessible by executing system) according to the file organizing mechanism of the knowledge structure;

the internal control mechanism will then activate the thinking mode, wherein according to the thinking rules designated by the internal control mechanism, the thinking mode can obtain the identifying information and link information of the existing element files of the knowledge structure that match with the elements of the input information and trigger analyzing process of the thinking mode;

wherein according to the thinking rules designated by the internal control mechanism, the thinking mode can establish new direct links between the existing elements of the knowledge structure that match with the elements of the input information according to the input information, or establishing new element files for the elements of the input information according to the internal control rules and structure rules;

wherein the internal control mechanism can operate inquiry mode according to the internal control rules based on the results from the analyzing process of the thinking mode, wherein the inquiries can be sent to display device or output device or document structure, to inquire information, wherein the input information responding to the inquiries will be processed by inputting mode, reading mode, thinking mode, writing mode and output mode to establish new direct links between the existing elements, new direct links between new elements and existing elements of the knowledge structure, and new element files, and provide output information;

if new links and/or new element files and/or new process files are established, the internal control mechanism can operate the verification mode to verify new direct links and the new linking processes, then operate the memorizing mode to save the results in the knowledge structure; the internal control mechanism can also operate the system update mode to update the internal control rules, the structure rules, and the process files in the process structure, wherein the system operator's participations are often needed;

wherein the entire process of the executing system can be saved in the system log.

According to the present invention, the human knowledge system basically is a system with multiple, multidimensional links between various language elements, and the function of the human languages, and more specifically sentences of the human languages is to establish and express links between various language elements. By treating sentences as links between elements, the variation and complexity of the sentence structures is dissolved.

The knowledge structure comprises numerous element files and a file organizing mechanism. Each element file contains information identifying and distinguishing the element and knowledge indicating direct connections of this element with other elements. The identifying information is about whether the element is a word, a phrase, a symbol, or a graphic, etc., and for a word, what language is the word, and whether the word is a noun, a verb, a pronoun, etc. The link information is about whether the meaning of the word is general, specific, or interchangeable with other words, the way the element is supposed to be used in sentences, the conditions and results related with the element, the attributes of the element, and other information indicating how this element is related to other elements. Further, information in the element files will tell executing system how to act in respond to the information. Preferably, each element file comprises an identification file, and a link file. The file organizing mechanism provides ways for the element files to be easily located by the executing system. The file name of the element file could be the name of the element. The element files could be arranged according to the alphabetical order of the elements, and the element files could be located alphabetically by the executing system according to the organizing mechanism.

The document structure of the present invention comprises document entry files, document addresses, document contents, and a document organizing mechanism. In one preferred embodiment of the present invention, the document entry files are subject words (or phrases) files that contain feature words (or phrases), which present the subjects and features of the documents that they represent.

The executing system can take information, read information, think about the information, write answers, output answers, verify changes and new processes, memorize changes to the element files and new processes, and update system commands or setup. The executing system comprises internal control mechanism contains internal control rules that are instructions so that not only it will be in action in respond to the input, but also will be in action according to the internal setup or instructions of the executing system. The internal control mechanism also includes structure rules containing sentence structure information for analyzing and reconstruct sentences. The structure rules can also contain logic structure information for making decisions in linking processes.

The executing system can take input and convert it into readable format, then read the information, i.e., each element of the input information will be identified by searching and locating the element file that matches this element. The element files will be loaded to a location easily accessible by the executing system. Then the executing system will start thinking mode by looking into the element files and find out whether the element is a noun, a verb, a pronoun, a symbol, etc. This information of the words in the sentence will be matched with standard sentence structures according to the structure rules in the executing system. The executing system may contain special internal control rules that correspond to special inputs as commands for special action routines that designate the sequences of the internal control mechanism. If no specific action routine is setup, any match of the specific sentence structure will trigger a preset action routine. For a statement sentence, new links of the words will be established by the statement. For a question sentence, a sequence of actions will be taken to perform the task to find answers for the question. For a command sentence, actions will be taken to follow the command. Actions taken by the executing system will require further reading of the element files in the sentences. The sequence of actions that lead to successfully perform the task will be saved as a process file, identified by initial input and the task request. The process files belong to the process structure, acted as the rule base for the executing system. Preferably, any actions taken by the executing system will be simultaneously saved in the system log, identified by critical elements, time of actions, etc. Preferably, the executing system of the present invention will also be able to imitate human logic process such as generalization, deduction, etc. to make new links and create new process files according to existing links and process files. These actions should be directed by commands provided by the executing system, rather than external inputs.

If the task for the system of the present invention is to search for certain information, or documents contain certain information in the document structure, thinking mode will first analyze the identification information and link information of the element files of the input information and obtain subject words (or phrases), and feature words (or phrases). Then, the inquiry mode will search the documents in the document structure according to the subject words (or phrases), and feature words (or phrases) to obtain corresponding subject words (or phrases) files. The subject words (or phrases) files contain information including feature words (or phrases), and addresses for the corresponding document contents that be processed by the executing system and provided to the users, and the corresponding document contents can also be processed by the executing system and the results to be presented to the users.

The system of the present invention is capable of making inquiries to system operator and/or database library, and/or Internet resources about new elements, conditions and links. The executing system will command to make new links or make new inquiries. The executing system can also verify the established links and processes by making inquiries to confirm the links and process. Therefore, the system of the present invention will not only respond to the inputting commands, but also generating its own commands according to the executing system set up, knowledge structure and process structure, and sometimes system log. The executing system of the present invention should be able to accept new commands and process routines from input convert them into internal set up.

BRIEF DESCRIPTION OF THE DRAWINGS

The above and further features and advantages of the present invention may be appreciated from the detailed description of preferred embodiments with reference to the accompanying drawings, in which.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
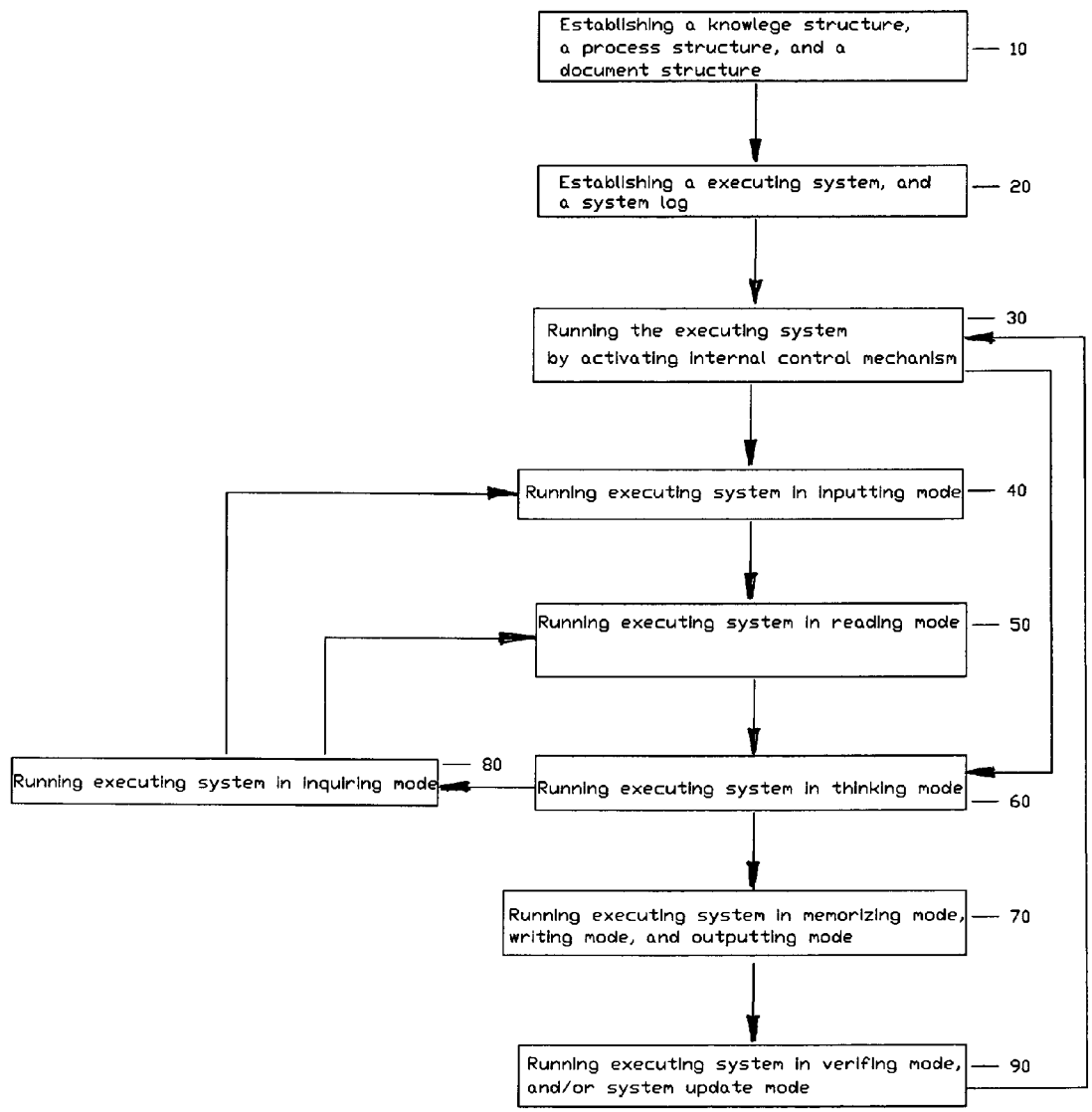
FIG. 1 is a schematic illustration of one preferred embodiment of the method of the present invention.

As seen in FIG. 1, the method of the present invention comprises the steps of:

Step 10a: establishing a knowledge structure including a file organizing mechanism, and more than one element files, wherein the element file includes identifying information and link information;

wherein the identifying information identifies the elements, wherein the link information includes knowledge about the elements, wherein the knowledge is information related to at least one direct links of the element with other elements of the knowledge structure.

Step 10b: establishing a process structure comprising a process file organizing mechanism, and at least one process file.

The process files are identified by the types of processes, the inputs, the outputs, and the conditions of the processes. The process files basically are files for rules of the processes. The purpose of building the process structure that contains process files is to provide a mechanism that the process files can be generated, modified and expanded by the operation of the executing system of the present invention. The process file organizing mechanism can identify and locate the process files and provide access for the executing system to use the process files.

In one preferred embodiment of the present invention, the process files can be obtained from input information. Sentences can be used to establish element files, or process files. If the sentence is about the attributes of a particular person or entity, the information from the sentence can be used to establish or add additional information to the element files of the person or entity. If the sentence states one or more processes, makes judgment about a process, or states some features of an abstract word, the information from the sentence can be used to establish a process file. For example, the sentence in the last paragraph "The purpose of building the process structure that contains process files is to provide a mechanism that the process files can be generated, modified and expanded by the operation of the executing system of the present invention" can establish a process file "building (process structure (process files)) {purpose: generate, modify and expand the process files}". In another example, the sentence in this paragraph "If the sentence is about the attributes of a particular person or entity, the information from the sentence can be used to establish or add additional information to the element files of the person or entity" can establish a process file "establish(element files (person, or entity), information) or add to(element files(person, or entity), (additional)information) {condition: information(sentence)=(attributes(person, or entity))}.

Step 10e: establishing a document structure comprising document entry files, document addresses, document contents, and a document organizing mechanism.

The document structure can be used for organizing documents within the thinking system or documents in a broader environment (such as in the World Wide Web). In one preferred embodiment of the present invention, documents of the document structure are processed to obtain subject words (or phrases), that can generally be referred to as subject terms, and for each document one or more subject word (or phrase) files are provided as document entry files, wherein other contents of the documents are attributes of the subject words (or phrases), wherein the feature attributes of the subject words (or phrases) are identified as feature words (or phrases), that can generally be referred to as feature terms, and the subject words (or phrases) and corresponding feature words (or phrases) are used to identify the documents that contain the subject terms and corresponding feature terms. The subject word (or phrase) files are provided which contains attributes of the subject word (or phrase) according to the documents, wherein words for expressing the attributes can be used as feature words (or phrases) for search purposes. In one preferred embodiment of the present invention, all subject terms together with corresponding feature terms in respective documents are located in document entry files for respective documents, i.e., one document corresponds to one document entry file, and the document entry files may include more than one subject terms with corresponding feature terms. The document entry files will include the address of the documents to provide access to the documents. The document entry files can be searched and the subject terms and feature terms can be used together to find specific documents that include the subject terms and corresponding feature terms.

In one preferred embodiment of the present invention, the search terms are divided into subject terms and corresponding feature terms, and document entry files comprising respective subject terms and corresponding feature terms will provide access to documents including subject terms and corresponding feature terms.

In one preferred embodiment of the present invention, the documents can be processed by the executing system of the present invention. In one preferred embodiment of the present invention, the documents can be processed to obtain nouns and divided into proper nouns (or noun phrases), common nouns, and abstract nouns, etc. Proper nouns (or noun phrases) that appear most frequently in the particular document may be first assumed as possible subject words, and the element files of the proper nouns (or noun phrases) will be used to obtain attributes, or values of the attributes of the proper nouns (or noun phrases), so that to determining the relationship between the proper nouns (or noun phrases) with other proper nouns (or noun phrases), common nouns, and abstract nouns, etc., so that to determine the subject word (or phrase) files and feature words (or phrases).

In another preferred embodiment of the present invention, documents are summarized to obtain key words. The document entry files comprises key words (as file names) and containing lists of document names having the key words, and corresponding address information of the documents having the key words.

In another preferred embodiment of the present invention, documents are processed by the thinking system (and/or with the assistance of human operators) to be divided into categories and sub-categories, and then the documents are organized according to the categories. The document entry files having category names as file names and include lists of document names belonging to the categories, and corresponding address information of the documents belong to the categories.

In another preferred embodiment of the present invention, documents are processed to obtain content word lists that the documents contain. The document entry files comprises content words (as file names) and containing lists of document names having the content words, and corresponding address information of the documents having the content words.

Step 20: establishing an executing system comprising an internal control mechanism and an inputting mode, a reading mode, a thinking mode, a writing mode, a memorizing mode, an outputting mode, an inquiry mode, verification mode, and a system update mode;

Establishing a system log;

wherein the inputting mode includes inputting rules, wherein the reading mode includes reading rules, wherein the thinking mode includes thinking rules, wherein the writing mode includes writing rules, wherein the memorizing mode includes memorizing rules, wherein the outputting mode includes outputting rules, wherein the inquiry mode includes inquiring rules, wherein the verification mode includes verification rules; wherein the system update mode includes system update rules;

wherein the internal control mechanism includes internal control rules, and structure rules;

wherein the internal control rules further comprises basic rules, task rules, and target rules.

The internal control rules generally designate the operating process of the executing system. The entire operation of the thinking system is directed by various combinations of rules including internal control rules, and rules in various modes. The quality and ability of the thinking system depends on the sophistication and complicity of the rules.

The structure rules relate to the grammar and sentence structures of the language. For example, structure rules provide various sentence structures of various languages that can be used for different purposes.

Step 30: running the executing system wherein the internal control mechanism can operate constantly, wherein the thinking mode, inquiry mode, memorizing mode, verification mode, and the system update mode can be activated according to the internal control rules of the internal control mechanism not triggered by an input;

wherein according to the thinking rule, direct link between a first existing element and a second existing element can be used to establish new direct links between the first existing element and at least one existing element with direct link with the second existing element;

wherein according to the internal control rules, and the inquiry rules, inputting rules, reading rules, thinking rules, memorizing rules, verification rules, and the system update rules, the executing system can obtain and verify information from document structure and update the knowledge structure;

wherein according to the internal control rules, inputting rules, reading rules, thinking rules, writing rules, output rules, and/or memorizing rules, verification rules, and the system update rules, the executing system can process documents in the document structure and establish new document entry files for document structure;

wherein according to the thinking rules, process files can be used to establish new direct links between the existing elements, and the system update rules will be used to update the existing element files;

wherein according to the thinking rules, new process files can be obtained by processing information from the existing element files, and existing process files.

Step 40: if input information is received from an inputting device, the internal control mechanism will operate inputting mode according to the internal control rules, wherein the input information will be converted to format conformed with the format requirement by the executing system according to the inputting rules, wherein information other than language may be converted to language information by information processing tools.

Step 50: once input information is received and processed in the inputting mode by the executing system, the internal control mechanism will activate reading mode according to the internal control rules, wherein according to the reading rules, the input information (especially the language input) will be disseminated into elements and element files of the knowledge structure of the corresponding elements matched with the input elements will be located and loaded into the executing system (or areas easily accessible by executing system) according to the file organizing mechanism of the knowledge structure.

Step 60: the internal control mechanism will activate the thinking mode to read the identifying information of the element files of each of the input elements according to the thinking rules, wherein the structure rules of the internal control mechanism can determine sentence structure of the input to decide what kind of task the input is calling for, and determine corresponding internal control rules for operating the internal control mechanism;

wherein when the input information is a task command with specific format, it may directly trigger the structure rule of the internal control mechanism to determine corresponding internal control rules for operating the internal control mechanism;

wherein if it is determined that a specific task is called for, or if the type of task is preset, the task rules will be used to perform the tasks;

wherein according to the thinking rules designated by the internal control mechanism, the thinking mode can analysis the input information according to the identifying information and the knowledge information;

wherein according to the thinking rules designated by the internal control mechanism, the thinking mode can establish new direct links between the existing elements of the knowledge structure that match with the elements of the input information according to the input information;

wherein the existing direct links between the existing elements that match with the elements of the input information and other existing elements of the knowledge structure in each of the said existing element file can be used to further provide new direct links between the existing elements that match with the elements of the input information and more other existing elements in the knowledge structure, the linking processes of the elements related to the input information with other elements in the knowledge structure can continue according to the direct links of the elements with other elements according to the element files of the elements, and update element files for elements linked with the input information;

wherein when the task calls for establishing a direct link between a first existing element and a second existing element, the direct links of the first existing element with other existing elements in the knowledge structure according to the element file of said first existing element will lead to the element files of said other existing elements that link with the first existing element, the direct links of said other existing elements that link with the first existing element with more other existing elements in the knowledge structure according to the element files of said other existing elements that link with the first existing element will lead to the element files of said more other existing elements that link with the first existing element, wherein the direct links of the second existing element with other existing elements in the knowledge structure according to the element file of said second existing element will lead to the element files of said other existing elements that link with the second existing element, the direct links of said other existing elements that link with the second existing element with more other existing elements in the knowledge structure according to the element files of said other existing elements that link with the second existing element will lead to the element files of said more other existing elements that link with the second existing element, wherein the linking process can continue until at least one direct link between the existing element that links to the first existing element and the existing element that links to the second existing element is found, wherein a direct link between the first existing element and the second existing element can be established by tracing back the linking process;

wherein the thinking mode search the process structure for process files, and using the process files to make new direct links between the existing elements;

wherein when no direct link between the existing element that links to the first existing element and the existing element that links to the second existing element can be found, the internal control mechanism can operate inquiry mode according to inquiring rules, wherein the inquiries can be sent to display device or output device to inquire information, or inquiries can be made to inquire information from internal document structure or document structures in remote locations, wherein the input information responding to the inquiries will be processed by inputting mode, reading mode, and thinking mode to find direct link between the first existing element and the second existing element.

When no links can be found between the first existing element and the second existing element, the thinking mode of the present invention can made assumptions or predictions based on processes such as generalizations, inductions to established links between the first existing element and the second existing element. The rules of making assumptions and predictions may vary depending on the elements involved and the purpose of the task, it also depends on whether the links include subjective links.

In one preferred embodiment of the present invention, when the task calls for obtaining information from the document structure or find documents in the document structure based on the input terms (performing search function), the thinking process will first analyze the input information, wherein information in the element files of the input information will be used. In one preferred embodiment of the present invention, according to the identification information of the element files and the link information of the element files, task rules, structure rules along with thinking rules can be used to find subject words (or phrases) and feature words (or phrases) for conducting searches in the document structure. The purpose of the analysis is to find subject words (or phrases) and feature words (or phrases), and most likely subject words (or phrases) will be nouns (or noun phrases), especially proper nouns (or noun phrases), while feature words (or phrases) will be attributes or values of the attributes of the subject words (or phrases).

Step 70: wherein if the thinking mode established the new direct link between the first existing element and the second existing element, and the new direct link between the first existing element and the second existing element is a permanent link, the new direct link can be saved to the element file of the first existing element and the element file of the second existing element by the memorizing mode according to the memorizing rule, wherein the linking process for linking the first existing element with the second existing element can be saved as a process file to a process structure by the memorizing mode according to the memorizing rule, wherein information including the new direct link between the first existing element and the second existing element can be written to a display device by the writing mode according to the writing rules and the structure rules of the internal control mechanism, wherein the new direct link between the first existing element and the second existing element can also lead to information other than language and be outputted as control signal to output device by the outputting mode according to the outputting rules.

Step 80: wherein if thinking mode cannot establish connections between the existing elements, the internal control mechanism can operate inquiry mode according to the internal control rules, wherein the inquiries can be sent to display device or output device to inquire information, wherein the input information responding to the inquiries will be processed by inputting mode, reading mode, and thinking mode, and memorizing mode to establish new direct links between the existing elements, new direct links between new elements and existing elements of the knowledge structure, and new element files.

If the task is to search and obtain information from the document structure, the inquiry mode may inquire information from the document structure wherein the document structure can be searched for and obtain information to establish new links between existing elements, or to establish new element files. If the task is to search and obtain information from the document structure according to the user inputs, in one preferred embodiment of the present invention, the possible subject words (or phrases) and/or feature words (or phrases) obtained by the thinking mode will be used to search the document structure to find the documents that correspond to the subject word (or phrase) files (as document entry files) obtained using the subject words (or phrases) and/or feature words (or phrases). Then either the subject word (or phrase) files, documents, or their addresses will be sent to the user directly, or the subject word (or phrase) files, or the documents can be processed to provide the processed outputs using the reading mode, thinking mode, writing mode, and output mode.

Step 90: if new links and/or new element files and/or new process files are established, the internal control mechanism can operate the verification mode to verify new direct links and the new linking processes; the internal control mechanism can also operate the system update mode to update the internal control rules, the structure rules, and the process files in the process structure, wherein the system operator's participations are often needed;

wherein the internal control mechanism can save the operating process of the executing system to system log files in the system log according to the internal control rules.

In one preferred embodiment of the present invention, the system log can be searched to obtain process related information. For example, if the system of the present invention is used to perform search function, the search processes in the system log along with some user information such as user profile can be used for conducting surveys or market researches, etc.

Figure 2A:
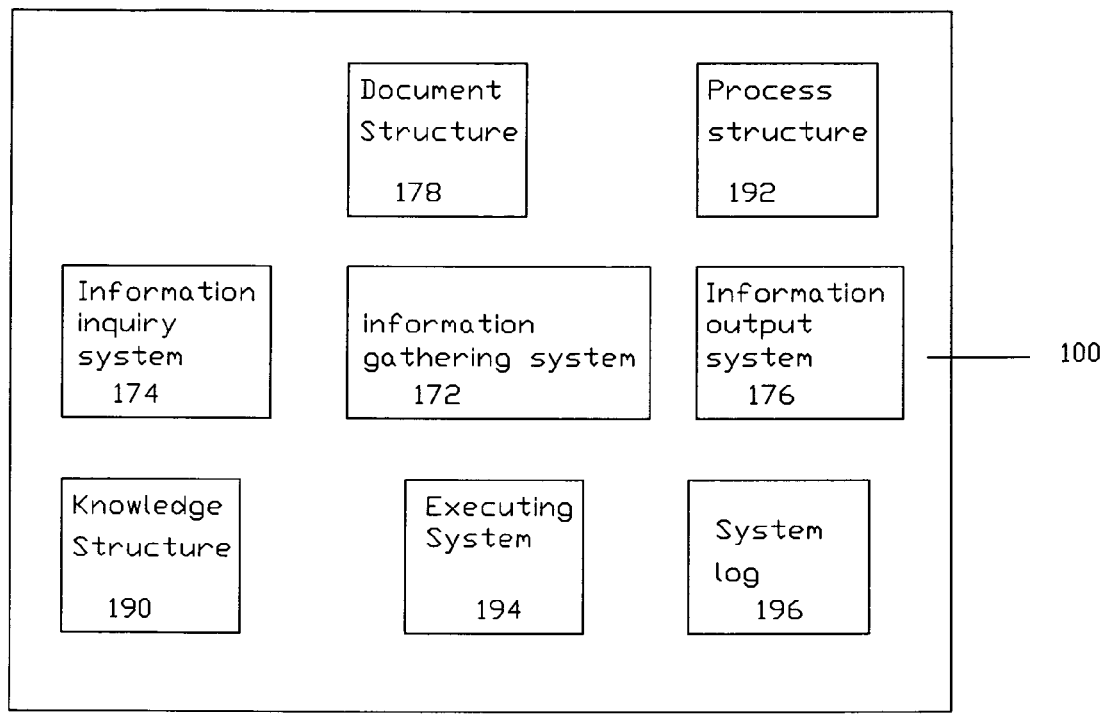
FIG. 2a is a schematic illustration of one preferred embodiment of the implication of the system of the present invention.

In one preferred embodiment of the present invention, as shown in FIG. 2a, the thinking system 100 comprises: an information gathering system 172, an information inquiry system 174, an information output system 176, a knowledge structure 190, a process structure 192, a document structure 178, an executing system 194, and a system log 196.

Figure 2B:
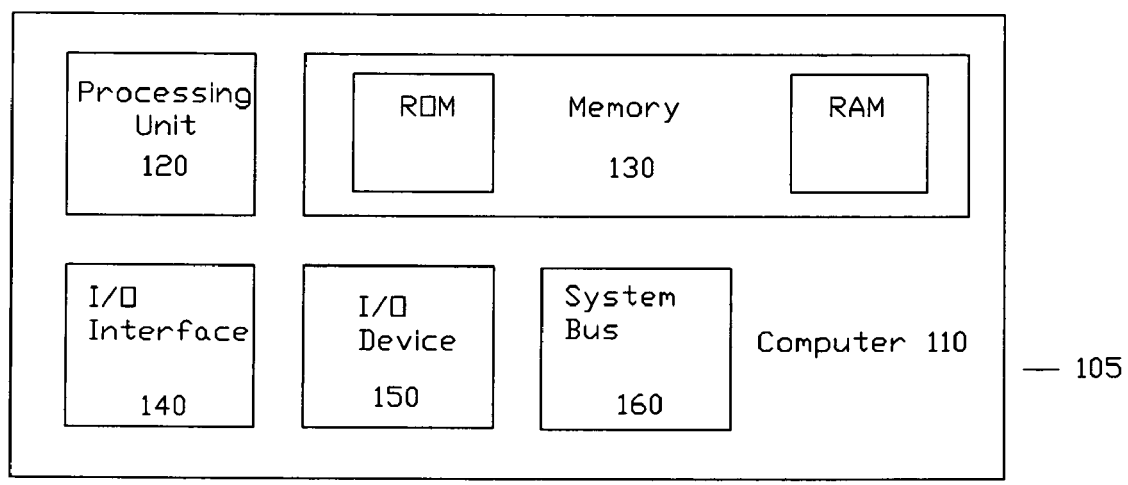
FIG. 2b is a schematic illustration of one preferred embodiment of the computer hardware implication of the system of the present invention.

In one preferred embodiment of the present invention, as shown in FIG. 2b, a computer hardware system 105 is used as part of the embodiment of the present invention that includes at least one computer 110, having at least a processing unit 120, a memory 130, an I/O interface 140, an I/O device 150, and a system bus 160 that interconnects various system components to the processing unit. The memory includes at least one read only memory (ROM) and one random access memory (RAM). A basic I/O interface, containing the basic routines that help to transfer information between elements within the computer, such as during start-up, is stored in ROM. The system bus comprises bus structures such as address buses, data buses, and control buses.

In this embodiment, the information gathering system 172 includes I/O devices 150 that provide input to the computer 110, and the information inquiry system 174, the information output system 176 are I/O devices 150 that the computer 110 provides control. The knowledge structure 190, the process structure 192, the document structure 178, the executing system 194, and the system log 196 are mostly software systems that are contained in the memory 130. The operation of the executing system 194 is mostly realized through the operation of at least one processing unit 120.

The information gathering system 172 may further comprises a word input system, and a touch/scan input system. The document structure 178 could be located in a remote location in a computer network, or can be dispersed in various locations connected by one or more networks.

In a preferred embodiment, the knowledge structure 190, the process structure 192, the document structure 178, the executing system 194, and the system log 196, can be duplicated.

Knowledge Structure

Figure 3:
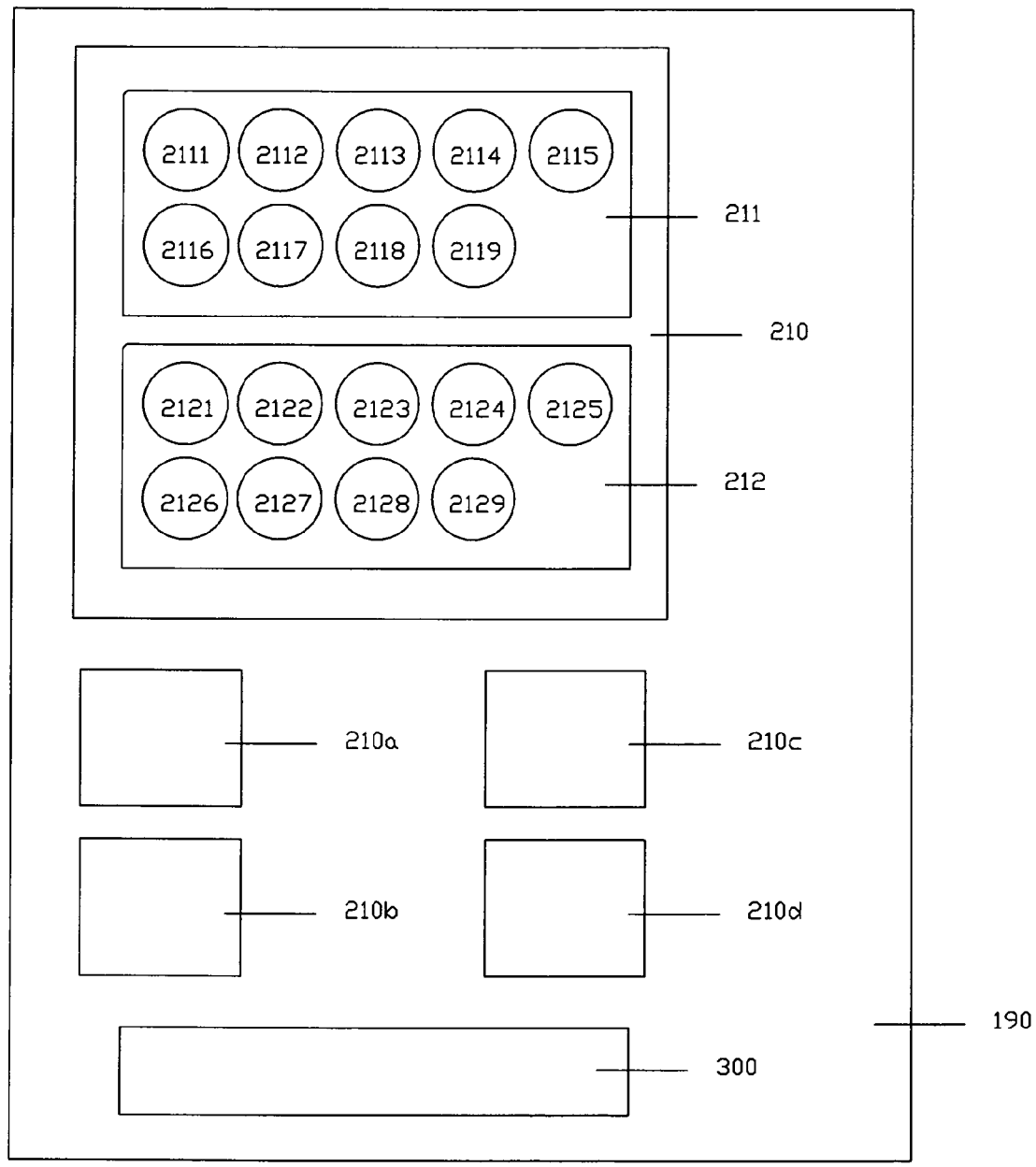
FIG. 3 is a schematic illustration of one preferred embodiment of the knowledge structure of the system of the present invention.

In one preferred embodiment of the present invention, as shown in FIG. 3, the knowledge structure 190 of the present invention comprises knowledge files and file organizing mechanism 300.

The knowledge files comprises numerous element files 210. Each element file 210 comprises an identification file 211, and a link file 212.

In a preferred embodiment, the identification file 211 comprises a first identification value 2111, a second identification value 2112, a third identification value 2113, a fourth identification value 2114, a fifth identification value 2115, a sixth identification value 2116, a seventh identification value 2117, a eighth identification value 2118, and a ninth identification value 2119. Different identification values of an element file can trigger different actions of the executing system 194.

In one preferred embodiment, the first identification value 2111 indicates the first element file 210 is a file for a word. The second identification value 2112 indicates what type of language is the word. In general the first identification value 2111 of a element file 210 could indicates whether the element is a word, a phrase, a sentence, a paragraph, a collection of paragraphs, even a book, a process, a symbol, a graphic, a formula, a sound or some other type of record.

The third identification value 2113 indicates whether the word is a noun, a verb, a pronoun, a verbal, an adjective, an adverb, an article, a preposition, a conjunction, or an interjection. In general, the second identification value 2112 through the ninth identification value 1119 could be any feature indication or a blank value.

The fourth identification value 2114 indicates the classes of nouns, verbs, pronouns, adjectives, and adverbs. The nouns are divided into classes including common nouns, proper nouns, collective nouns, count nouns, mass nouns, concrete nouns, abstract nouns. The verbs are divided into classes including transitive, intransitive, linking verbs, and auxiliary verbs. Pronouns fall into several classes including personal pronouns, indefinite pronouns, demonstrative pronouns, the relative pronouns, intensive and reflexive pronouns, intensive pronouns, reflexive pronouns, interrogative pronouns. Adjectives are divided into descriptive adjectives, limiting adjectives, possessives, words that show number, demonstrative adjectives, interrogative adjectives, and numbers, proper adjectives, attributive adjectives, predicate adjectives. Adverbs can be divided into classes of modifiers of verbs, adjectives and other adverbs; sentence modifiers. Words of different classes represent different meanings, usage, and corresponding sentence structures.

The fifth identification value 2115 indicates the forms of nouns, verbs, pronouns, adjectives, and adverbs. Nouns have forms in subjective and objective case, possessive case, and plural. Verbs have forms of simple, past tense, past participle, present participle, and -s form. Pronouns have forms of subjective, objective, possessive. Adjectives have three forms: positive, comparative, and superlative. Adverbs have three forms: positive, comparative, and superlative. Words in different forms reflect their functions, usage, and corresponding sentence structures.

In one preferred embodiment, the sixth identification value 2116 indicates the category of a noun (or noun phrase), whether it is for who, what, where, when or how. For example, for the phrase "Los Angeles", it can belong to either what or where category.

The link file 212 indicates the connections the element has with other elements. The link file 212 comprises a first link information file 2121, a second link information file 2122, a third link information file 2123, a fourth link information file 2124, a fifth link information file 2125, a sixth link information file 2126, a seventh link information file 2127, an eighth link information file 2128, and a ninth link information file 2129.

Figure 4:
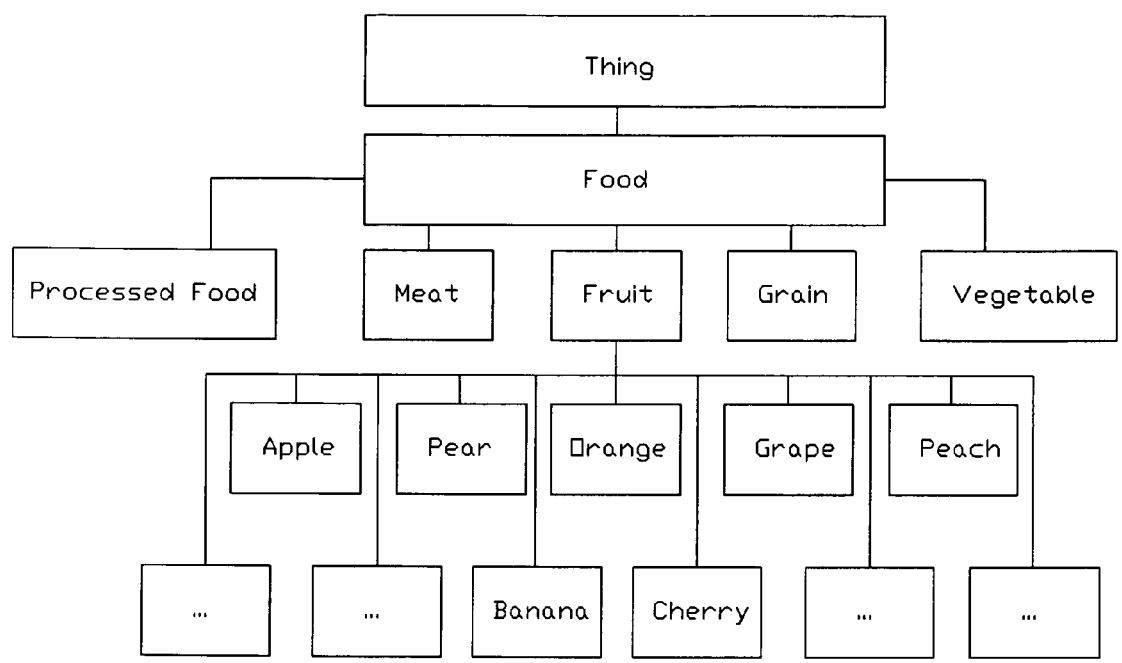
FIG. 4 is an exemplary illustration of a word tree in a first link information file of an element file in the knowledge structure of the system of the present invention.

In a preferred embodiment, the first link information file 2121 establishes vertical connections between words. The first link information file 2121 comprises a word tree field, and an information field. The word tree field contains one or more groups of words connected by a tree like structure, wherein the word in the top of the tree structure is most general in meaning. Going down the tree structure, the words will be more specific in meaning. Preferably, the word tree structure should contain all words that have vertical connection with this element. For example, for the element file for fruit, the word tree field may contain thing, food, fruit, apple, pear, orange, etc. as indicated in FIG. 4. In general, a word in lower level should be able to replace the word in the upper level in just about all sentences. If in some situations there are exceptions (usually when words in the word tree fields have multiple meanings, and only one meaning related to the word of the element file), these exceptions should be provided in the information field. If the word of the element file has more than one meaning, more than one word tree can be provided in the word tree field, and the condition or usage of the different word trees will be indicated in the information field. Phrases can be treated like words as for elements of the element files, or in the element files, with indication that they are phrases functioning as words.

The first link information file 2121 would likely be blank for pronouns, propositions, conjunctions, interjections, and articles.

The second link information file 2122 establishes horizontal connections between words. The second link information file 2122 comprises word field, and word information field. The word field contains words that are interchangeable with the word of the element file 210. If in some situations there are exceptions (for example, when the word has different meanings), these exceptions should be provided in the word information field. The words that have similar meaning with the word of the element file 212 can also be included in the word field, wherein the word information field will contain the differences in meanings and functions of the words. The word field may also contain the words in different forms with the same meaning as the word of the element file 210, wherein the word information field will indicate difference in usages and functions. The word field may also contain words in other languages that have similar meanings as the word of the element file 210, wherein the word information field will indicate the usage and corresponding sentence structures information, etc. Phrases can be treated like words as for elements of the element files, or in the element files, with indication that they are phrases functioning as words. The second link information files are especially useful for nouns, verbs, pronouns in related to different forms, or tenses, or moods, or voices and their usages.

Pronouns are used as the replacement of nouns. The second link information file 2122 for a pronoun will indicate the noun or nouns that the pronoun is equivalent in meaning and usage to (often of nouns that are most general in meaning of the group). Difference forms can also be indicated with the information in different usages and functions.

The second link information file 2122 would likely be blank for propositions, conjunctions, interjections, and articles.

The third link information file 2123 establishes the way the word will be used in a sentence. The information in the third link information file 2123 usually contains information for the specific ways the word is used in sentences. The third link information file 2123 comprises a link field, and a link information field. For nouns, pronouns, the link field may contain their effects on verbs to change forms, the specific words they can be associated with, and specific changes in the sentence structure. For a noun, this file may indicate the link between the phrases that contain this noun with other words. For a verb, the link field may contain sentences that reflect the sentence structures of which the verb can be used. By using the words (nouns, pronouns, other verbs, etc.) that are most general in meaning to construct the sentences, the links between this verb and other words can be established. The link information filed indicates the condition for the verb can be used in these sentences. For example, for the word "eat", the link field may contain: "Animals eat food. I eat food. I am eating food now. I ate food in the past. I have eaten food before. Animal eats food."

The third link information file 2123 can also establish links for words in different groups but have related meaning. For example, verb "act" is related to noun "action". This link can be indicated in the third link information file 2123 for both words.

For propositions, conjunctions, interjections, and articles, the third link information file 2123 may indicate the functions of the word of the element file in the sentences. A proposition always connects a noun, a pronoun, or a word group functioning as a noun to another word in the sentence. The noun, pronoun, or word group so connected is the object of the preposition. The preposition plus its object and any modifiers is a prepositional phrase. The third link information file 2123 of a proposition may contain commonly used prepositional phrase wherein other words in the phrases are in most possible general terms in meanings.

The fourth link information file 2124 establishes the conditions or occurrences that will cause the action or condition represented by the word. This file can be blank for the word of the element file that is a noun, pronoun. For verbs, this file can provide information as to why the action takes place. The link between the cause and the word of the element file can be absolute, i.e., if the conditions or occurrences are true, then the action that is represented by the word of the element file will occur. This is often represented by "if and then" phrase, and other words in the sentence should be the most general type of the words. For example, for word "rotate", one sentence in the fourth link information file 2124 could be: "if a net eccentric force is applied to an object, then it will rotate." You can see this type of links usually exist for natural occurrences. Sometimes, the link may or may not be true, depend on certain conditions. For example, for the word "boil", one sentence establishes the link could be: "if the water temperature is 100° C., then it will be boiling in the normal atmosphere." In this case, the temperature and pressure are both conditions for the water to boil. For some words, especially the words reflect the mental states or the actions of humans, or other living things, the links are not as certain. Then the sentences that reflect these links should reflect these uncertainties. For example, for the word "laugh", one of the sentences establishes the link could be: "if one finds something interesting, then it is possible that this person will laugh". The possible link could also be expressed using "because": "Because I found something interesting, I laughed." There could be more than one conditions or occurrences that will cause the action represented by the word. Therefore, the fourth link information file 2124 could contain numerous if-then sentences. The links can also be established by using existing process files.

For adjectives, the fourth link information file 2124 may provide information why the condition exists. The link between the cause and the condition can also be absolute, conditional, or a possibility. For example, for the word "wet", one sentence establishes the link could be: "if it rains, then the ground will be wet". For the word "rotatable", one sentence establishes the link could be: "if the object is not fixed, then it is rotatable". For the word "red", one sentence established the link could be: "if the a person is embarrassed, the person's face could turn red." The fourth link information file 2124 may also provide information why the condition exists for adverbs.

The fifth link information file 2125 establishes what will be the result of the action represented by the word. This file is for verbs mostly. The link between the word and the result can be absolute, conditional, or a possibility. The sentences could also be in the format of "if-then". For example, for the word "burn", one sentence establishes the link could be: "if a piece of material is burning, then it will consume oxygen." For the word "hit", one sentences establishes the link could be: "if an moving object is hit, then it will change directions." For the word "run", one sentences established the link could be: "if a person is running, then this person may be sweating." As for the fourth link information file, there should be numerous links in the fifth link information file for the most time. It is the goal of the link files, as well as of the fourth link information files and the fifth link information files, to establish all possible links between words or phrases through direct links and indirect links. The links can also be established by using existing process files.

The sixth link information file 2126 contains identifying attributes and informational attributes of the word. The attributes are words that describe the characteristics of the word of the element file. Generally speaking, the sixth link information file 2126 is for nouns, and maybe verbs. The contents are words that define the fields and defined fields with or without values. For word that is general in meaning, most of the defined fields will not have values. For word that is the most specific, all the fields may have values. For example, a word "person" will have information attributes such as birthday, height, weight, blood type, education, number of brain, arms, etc., but most of field will be blank, except for one brain, two arms, etc. For a word "Elvis", his birthday, blood type, education, etc, will all have a value. But here you can see the word "Elvis" is not the most specific, only if when you say "Elvis at 10:01 Jun. 1, 1951", will you have the actually weight information. Words less general in meaning share the attributes for words that are more general in meaning linked by the word tree, but words general in meaning usually do not share all the attributes of the words less general in meaning linked by the word tree. Alternatively, the attribute information can be expressed in plain language. The identifying attributes usually are attributes with values that are unique to the element. The informational attributes can be in any thing related to the element. The format for the attributes can be as sentences or tables or forms, formulas, etc.

It can be noticed that if an attribute (especially an identifying attribute) of a word that does not have a value is assigned with a value, it will be equivalent to a word that is less general in meaning and linked by the word tree. For example, "person" is more general than "teacher" and linked with "teacher" by the word tree. So, a person who teaches will be a teacher.

People or places may have the same names but have different attributes. For example, John Smith is a frequently used name for many males, but they will have different birthdays, different heights and weights, and different occupations, and different personal characteristics. Paris in France is totally different from Paris in Texas of United States. The differences in the attributes may be reflected in separate and distinguish files in the sixth link information files, but it may be better that different element files are established for each person or place. These element files can be arranged in sub-element files under the same general names, and distinguished by distinct attributes, and specific identification number or value can be assigned to each element file.

Adjectives and adverbs usually indicate where, when, how, or to what extent, these features can be defined attributes of the nouns or verbs. Many adjectives can provide values or information of the attributes of the nouns. For example, green can be the color of an object, such as Granny Smith apple. Therefore, green can be value of the color attribute of the Granny Smith apple.

The seventh link information file 2127 establishes connections between word that indicates attributes of other words with those other words. This link information file indicates links that is the reverse side of the sixth link information file 2126. If a word is usually used as attribute or description of other words, then this file identify the word that this word defined or being attributed for. To reduce the size of the file, if the word is an attribute for a group of words linked by word tree, the seventh link information file 2127 may include only the word most general in meaning. For example, the word color can describe a physical existence, i.e., a thing. Therefore, seventh link information file 2127 may indicate that color is an attribute of a thing. It does not need to including other words that are less general in meaning and linked with "thing" by word tree, such as, tree, apple, chair, human, etc.

The comparative form or superlative form of adjectives and adverbs establish links for objects with similar values of the attributes.

The eighth link information file 2128 indicates the derivative attributes or derivative values of the word of the element file. For example, for word "place", geographic location will be attribute for the place, and derivative attributes will be distance of this place with other places.

The ninth link information file 2129 indicates the connections between word that indicates the derivative attributes of other words with those other words. This link information file indicates links that are the reverse sides of the information indicated by the eighth link information file 2128. If a word can be used as derivative attribute of other words, then this file identify those other words. To reduce the size of the file, if the word is a derivative attribute for a group of words linked by a word tree, the ninth link information file 2129 may include only the word most general in meaning in the word tree.

The fourth link information file 2124, the fifth link information file 2125, the sixth link information file 2126, the seventh link information file 2127, the eighth link information file 2128, and the ninth link information file 2129 would likely be blank for propositions, conjunctions, interjections, and articles.

Other link information could be indicated in these link information files or other link information files.

If the element is a phrase, the first identification value 2111 indicates it is a file for a phrase. The second identification value 2112 indicates what type of language is the phrase. The third identification value 2113 indicates whether the phrase has the function of a noun, a verb, an adjective, an adverb, a preposition, a conjunction, or an interjection.

The link information file for a phrase will be similar to the file for the word that the phrase is equivalent in functions for. One specific difference is that the phrase can have most simplified form and more complex form. Generally, adding more words besides the key words will make the phrase more complex, and provides more specific meaning. The different form for the phrase can be provided in the first link information file and/or second link information file of the phrase.

Prepositional phrases usually function as adjectives or as adverbs, occasionally as nouns. The link information file for prepositional phrases may contain adjectives, adverbs, or nouns that they are similar to in meaning and function. The link information file may also contain information for special uses of the prepositional phrases in sentence.

Participles, gerunds, and infinitives—like other forms of verbs—may take subjects, objects, or complements, and they may be modified by adverbs. The verbal and all the words immediately related to it make up a verbal phrase. Like participles, participial phrases always serve as adjectives, modifying nouns or pronouns. Gerund phrases, like gerunds, always serve as nouns. Infinitive phrases may serve as nouns, adjectives, or adverbs. Because participle phrase could have same form as gerund phrases, the phrase link information file may have more than one meaning and/or function depending on the how they are used in sentences. The links for verbal phrases can also be established by using existing process files.

Absolute phrases consist of a noun or pronoun and a participle, plus any modifiers. Special use or meaning of the absolute phrases should be indicated in the link information file.

If the element is a symbol, a graphic, a sound or some other type of record, the second identification value 2112 through the ninth identification value 2119 could be any feature indication or a blank value. The element files may contain the link between each other, the link between it and a word or phrase, and other information related.

For a symbol, it may help to identify sentence structures, meaning and function of words and phrases, these information may be indicated by identification values and link information files.

The element files generally have words or word phrases as file names, thus processing conducted by executing system that involve searching the element files will be accomplished by searching the element files that have the words or word phrases as file names.

Document Structure

A document structure comprises document entry files, document addresses, document contents, and a document organizing mechanism, wherein each document content corresponds to a document address, wherein the document entry files including information related to the corresponding document contents, and document addresses of the document contents, wherein the document organizing mechanism provides access to the document contents according to the document addresses. The document structure may further comprise document summary files, and document summary file addresses, wherein the document entry files provide the document summary file addresses of the document summary files.

The document structure can be used for organizing documents within the thinking system or documents in a broader environment (such as in the World Wide Web). In one preferred embodiment of the present invention, documents are processed to obtain subject words (or phrases, the words or phrases can be generally referred to as terms), and for each document one or more subject word (or phrase) files are provided, wherein other contents of the documents are converted into attributes of the subject words (or phrases), wherein the identifying attributes of the subject words (or phrases) are identified as feature words (or phrases), and the subject words (or phrases) and corresponding feature words (or phrases) are used to identify the documents (wherein contents other than feature words (or phrases) can also be used to identify the documents) that contain the subject terms and corresponding feature terms. Subject word (or phrase) files are provided that contain attributes of the subject words (or phrases) according to the documents, wherein words for expressing the attributes can be used as feature words for search purposes. Generally speaking, the feature words (or phrases) of the subject word (phrase) files are the same as the words (or phrases) that correspond to the attributes of the element files of the subject words (or phrases), and those attributes usually are distinctive attributes, because one of the purpose of using these attributes in the subject word (phrase) files is to make distinction between subject word (phrase) files for the same subject word (phrase), and another purpose of using these attributes in the subject word (phrase) files is to divide subject words (or phrases) by categories identified by various attributes. The subject term files can be the document entry files that include document addresses along with the feature terms, document entry files can also comprise multiple subject term files. This embodiment is mostly used for documents about particular persons, or entities, i.e., the documents that have proper nouns (or noun phrases) as subject words (or phrases). However, it can also be used for subject word (or phrase) files of other nouns, provided that there are feature words that are linked with the subject words in certain ways. For example, common nouns for products or services that have various features and are provided by various entities (can be treated as one of the features as well) can also be subject terms.

The embodiment is based on the observation that many documents are mostly about one particular subjects, to be identified by one words or phrases, basically the "who" or "what", while sentences and paragraphs in the documents will provide various values for attributes of the words or phrases. Sometimes, the documents can talk about more than one subjects that are not related. Then the documents will be represented with more than one subject words (or phrases). The documents can also talk about more than one subjects that are related. In this situation, a term can be subject term in itself as well as feature term for other subject terms. The document entry files may contain all the subject terms that are linked with respective feature terms. In one preferred embodiment, the feature terms are labeled by the type of features, and searches can be conducted not just by the feature terms, but also linked with the type of features the feature terms are referring to.

For documents that cannot be represented with the subject word (or phrase) files including feature words, or documents that regard numerous subject words (or phrases), the document entry files may have names that relate to document addresses, and the contents of the document entry files may include subject word (or phrase) sequences including the subject words (or phrases), and words linked with subject words (or phrases) in specific ways (such as identifying links with other words, especially proper nouns that are related to the subject words (or phrases)), wherein the relationship between the subject words (or phrases) with other words can either be specified in detail, or not specified particularly. The document entry files also include document addresses for corresponding document contents.

In one preferred embodiment of the present invention, the documents can be processed by the executing system of the present invention. In one preferred embodiment of the present invention, the documents can be processed to obtain nouns that can be divided into proper nouns (or noun phrases), common nouns, and abstract nouns, etc. Proper nouns (or noun phrases) that appear most frequently in the particular document will be first assumed as possible subject words, and the element files of the proper nouns (or noun phrases) will be used to obtain attributes, or values of the attributes of the proper nouns (or noun phrases), so that to determining the relationship between the proper nouns (or noun phrases) with other proper nouns (or noun phrases), common nouns, and abstract nouns, etc., so that to determine the subject word (or phrase) files and feature words (or phrases). In process the document contents, the executing system can also look for titles of the documents, the words related to the words in the title, and sentences or word groups that provide attribute information for nouns, especially proper nouns, so that to determine the subject words for the document contents. Certain words (or phrases) can be given priorities as subject words. Once the subject words are selected, the executing system of the present invention can search the document contents for words that related to the attributes and values of the attributes of the subject words, to find feature words. Process rules can also be used to find subject words and feature words.

In general, documents may contain two types of sentences: one that provides attributes for a noun (especially for a person or entity), another provides process rules. For the one that provide attributes, there are permanent attributes, and transit attributes. For the purpose of establishing the subject word files for the documents, only sentences that provide permanent attributes are analyzed and the information in these sentences will be used to establish subject word files. For example, the sentence "John Smith is an artist" will provide value for the attribute "occupation" of the subject word file "John Smith". If John Smith stated he loved bird watching, it will provide value for the attribute "hobby" of the subject word file "John Smith". And if the document stated he exhibited his art in ABC gallery, it will provide value for attribute such as affiliated gallery of the subject word file "John Smith", and it could also provide value for attribute such as represented artists of the subject word file "ABC gallery". If John Smith created a painting called "I saw a bird", it will be the value for attribute such as body of work of the subject word file "John Smith". But if John Smith created a blog, and in one place he said "I saw a bird today", it will be ignored, and not be used to establish subject word file "John Smith". And if there is a sentence such as "Seeing is believing", it may also be ignored because it did not provide attribute for a person or an entity (although it can be used to establish a process file which will might contain the information of the document address as the source of origin). With this method, document contents can be summarized to the format of subject word files rather quickly.

In another preferred embodiment of the present invention, documents are summarized to obtain key words or word phrases. The document entry files comprises key words or word phrases (as file names) and containing lists of document names having the key words or word phrases, and corresponding address information of the documents having the key words or word phrases.

In another preferred embodiment of the present invention, documents are processed by the thinking system (and/or with the assistance of human operators) to be divided into categories and sub-categories, and then the documents are organized according to the categories. The document entry files have category names as file names and include lists of document names belonging to the categories, and corresponding address information of the documents belong to the categories. One document can belong to multiple categories.

In this embodiment, the document structure has more definite structure, generally in hieratic structure. By dividing documents into categories and sub-categories, the documents with similar meanings will be grouped together, thus the need for finding words with similar meaning or general meaning decreased. But the determination and division of categories can be arbitrary, although documents could be linked with different categories, there are always boarder-line instances that the documents may be mis-categorized that reduce the capacity and accuracy of the search. This method may be more useful for searches intended to locate the document, instead of searching for contents.

In another preferred embodiment of the present invention, documents are processed to obtain content word (or word phrase) lists that the documents contain. The document entry files comprise content words or word phrases (as file names) and containing lists of document names having the content words or word phrases, and corresponding address information of the documents having the content words or word phrases.

In this embodiment, document entry files will be established that each will contain the addresses of all the documents that contain the corresponding word. Generally, only words of substances will have document entry files. Thus words such as "the", "a", "of", etc., etc., will not have document entry files. When searching the document structure, the document entry files will be searched by the content words as the file names. Once the document entry files are obtained according to the content words, addresses of the documents that contain the content words can be obtained, thus the contents of the documents can be retrieved according to the document addresses. The document contents are loaded to the executing system as input information, and the executing system will process the documents to assure the relevancies, and retrieves useful information from the document contents (and to organize the information and to present it to the users and/or the document address can also be presented to the users for direct access.)

The document structure using content word (or word phrase) lists may provide more access to the documents. But the search results may be numerous thus may require more processing time. In practice, the four types of methods for the document structure may coexist in the same system and the particular way to conduct the search can be selected according to the task.

The document structure can be used for locating documents containing certain words, word phrases, or belonging to certain categories. The basic function of the document structure is similar to the function usually performed by a search engine, as it can provide lists and access information for documents that contain words, word phrases, or combinations of words and/or word phrases. However, the application of the system of the present invention using the document structure can expand and transcend the search function. Since the system of the present invention is able to understand the meaning of the languages, the system of the present invention can read the documents obtained by the search function of the document structure and provide relevant information and relevant documents.

Executing System

Figure 5:
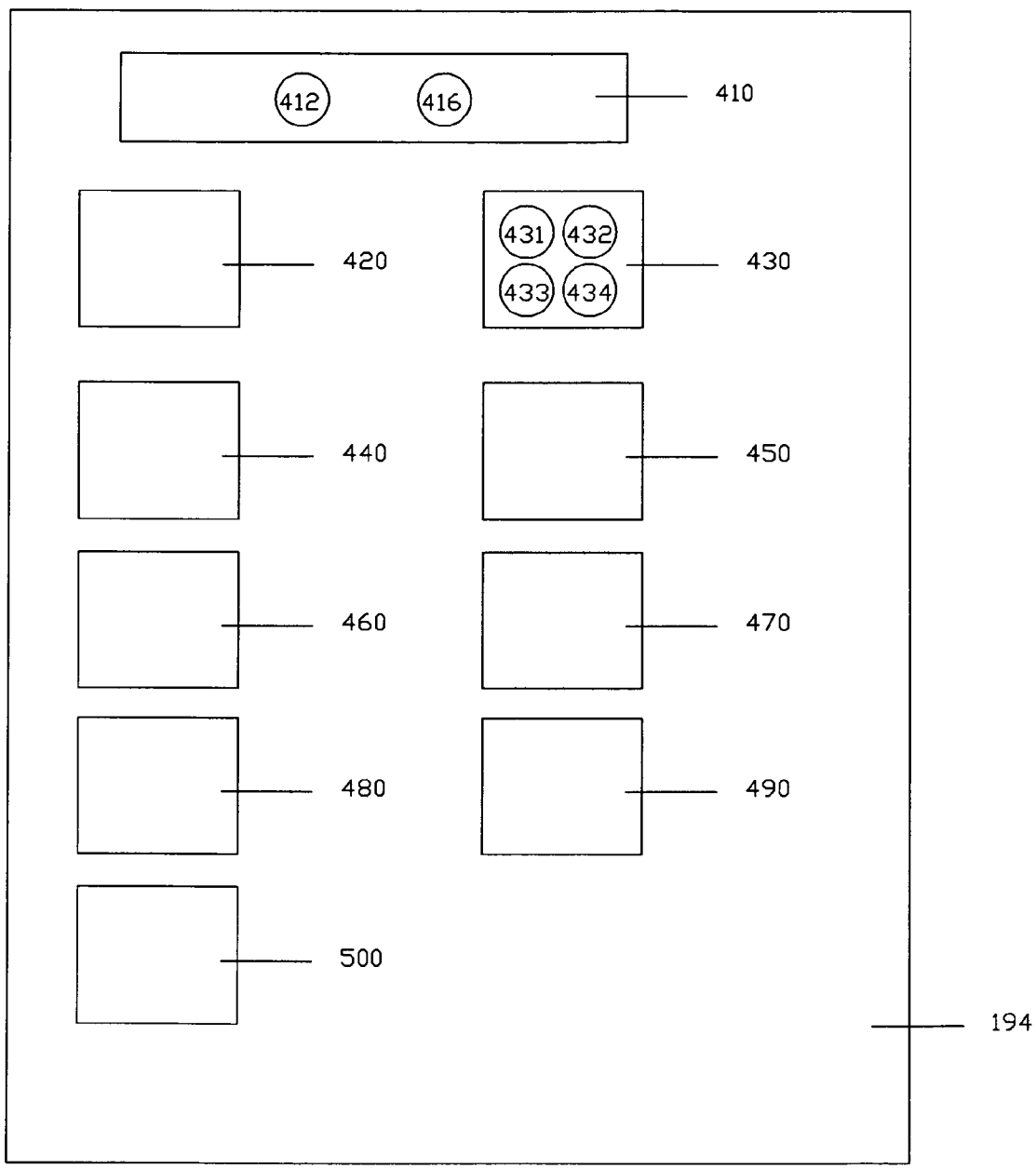
FIG. 5 is a schematic illustration of one preferred embodiment of the executing system of the system of the present invention.

As seen in FIG. 5, the executing system 194 comprises an internal control mechanism 410, an inputting mode 420, a reading mode 430, at least one thinking mode 440, a writing mode 450 and a memorizing mode 460, an outputting mode 470, an inquiry mode 480, a verification mode 490, and a system update mode 500. The internal control mechanism 410 includes internal control rules 412 and structure rules 416. The inputting mode 420 includes inputting rules, wherein the reading mode 430 includes reading rules, wherein the thinking modes 440 include thinking rules, wherein the writing mode 450 includes writing rules, wherein the memorizing mode 460 includes memorizing rules, wherein the outputting mode 470 includes outputting rules, wherein the inquiry mode 480 includes inquiring rules, wherein the verification mode 490 includes verification rules, wherein the system update mode 500 includes system update rules. The internal control mechanism 410 can control the inputting mode 420, a reading mode 430, a thinking mode 440, a writing mode 450 and a memorizing mode 460, an outputting mode 470, an inquiry mode 480, a verification mode 490, and a system update mode 500, wherein the internal control mechanism 410 can operate constantly.

The internal control mechanism 410 includes internal control rules 412, wherein the internal control rules comprising basic rules, task rules, target rules, etc. Essentially, the internal control mechanism 410 is a decision making mechanism that decide and control the operating process of the thinking system. The internal control rules in combination with the rules for each mode allow the processes of present invention to be realized. The detailed embodiment of the internal control mechanism can vary, and the internal control rules will be different for various embodiments.

The internal control mechanism shall be able to control and direct operating process of the system of the present invention in all situations. The basic idea is to provide internal operation sequence for any and all kinds of situations. The basic sequence of operation of present invention is a sequence wherein the operation process of the thinking system in any and every situation will be decided. Generally, there are two kinds of operating processes, one with input, and one without input. When input information is provided, the thinking system will operate differently according to the type of input. If the input is a question that requires answer or a request for information, the thinking mode will provide thinking rules for solving the problems as indicated in this application. It generally requires making direct links between existing elements of the knowledge structure. If the input contains element that does not responding to any existing element file of the knowledge structure, the inquiry mode will be activated to acquire information regarding the new element.

There might be situations that input information will not trigger actionable responses, but can be used to revise or add to the links in the element files of the knowledge structure, or the input information does not seem to have any apparent use at the time, so it can simply be saved in the system log, that can be used in the future.

If no input is received by the thinking system, the operating process of the thinking system is only determined by the internal control rules and the internal structure of the thinking system. Depending on the use and design of the thinking system, the internal control rules can direct operating process such as searching for new information, or making new links between existing elements using deductive process, making assumptions by conducting generalization process, inductive process, engaging in imagination process, or continuing underlining process to achieve certain specific long time or underlining goals. The sequence of activity can be determined by the internal control rules and according to the recent input and activities of the thinking system. For example, the input information or information obtained as the results of inquiries for the purpose of completing particular tasks can be used to revise or establish other new links in the element files of the knowledge structure. For this purpose, the internal control rules that determine the operation process basically is a set of rules that determine which process will be given priority. The internal control rules can call on the process files to direct some processes of the executing system.

The basic rules of the internal control rules of the internal control mechanism 410 set up the basic operating process, wherein the basic rules control the basic operation such as when and how to switch from one mode to another, and setup the environment for each mode of operation. For example, a basic rule can be set that certain input will be given priority to other operations, that whenever this type of input is detected by the inputting devices, the executing system will switch to input mode, and suspend or abandon the on going process depending on the type of operation and designated by the basic rules. The basic rules can also set the default operating processes for the executing system.

The task rules of the internal control rules of the internal control mechanism 410 set up rules particular related to various tasks. For example, task rules for search tasks may provide particular ways of analyzing the input information and obtaining results to be used to conduct searches in the document structure.

The target rules of the internal control rules of the internal control mechanism 410 set up the long term targets (tasks to be completed or worked on over a long period of times) or the underline targets (on going tasks that usually have low priorities than other types of task) of the system. When no other actions will be taken by the executing system, the executing system will operate according to the target rules. For example, the target rules may designate that the thinking system may conduct activities such as searching the document structure for new words or word phrases and learn the meanings of them; and processing information in the knowledge structure and to make assumptions, by generalization, or induction and then try to verify the new assumptions, wherein the target rules may provide information as to when the executing system will try to learn new words, and when the executing system will make new assumptions. Also, the target rules may also direct the executing system to act to achieve some underlining goals that are input task requests that has low priorities and will require substantial processing time. For example, there might be a task input for finding all the documents in the document structure that contain the word phrase "Los Angeles", wherein the task has low priority, and the task cannot be completed (as new documents that contain the word phrase "Los Angeles" may be added to the document structure). The task can be converted to underlining target (or task) that the target rules may direct the executing system to act on when no other actions are required of the executing system. Generally speaking, the target rules tell the executing system what to do when no other actions are required.

In one embodiment of the present invention, one target rule of the thinking system can be set to scan websites on the internet to establish subject word files for new documents and update existing subject word files for existing documents by activate inquiry mode, reading mode, thinking mode, writing mode, and updating mode, or output mode.

In general, the internal control rules are files that contain commands that will be triggered by corresponding conditions. In any given time, and in any given point of the process of the executing system the thinking system is in certain condition, and the information that relates to the condition will often trigger internal control rules to direct the executing system to conduct the subsequent processes. The internal control rules can be in various formats, and what is essential is that inputs or internal conditions of the thinking system should be able to direct the executing system to process accordingly as directed by the internal control rules. Basically, the basic rules set up the basic framework of the process of the executing system, wherein the basic rules will direct the executing system to operate in various mode according to the current inputs or system conditions, and call upon various rules such as task rules, target rules, etc. to determine what processes should be conducted.

In one preferred embodiment of the present invention, an internal control rule organizing mechanism will organize the internal control rules according to internal control rule file names, wherein the internal control rule file names having alphabets, numbers or symbols that can be recognized by the internal control rule organizing mechanism and thus the internal control rule organizing mechanism will be able to provide access to the internal control rules according to the internal control rule file names. The contents of the internal control rule files will contain links between words, values, and other conditions with rules that control the action of the executing system of the thinking system. For example, an basic rule file for controlling the basic the process of conducting a search may be named "search(search, input( ))", wherein the content of the file "search(search, input( ))" may include commands such as "if search function is selected, then receiving input contents as input to be analyzed for conducting the search".

In one preferred embodiment of the present invention, the structure rules comprise basic sentence rules, sentence construction rules, sentence dissection rules, specific rules that correspond to specific function words or word phrases, etc. Generally speaking, the structure rules combined with information in the word element files provide ways for sentence construction and dissection that will follow the grammar rules of the respective language. By using the structure rules combined with information in the word element files, links can be established based on input information in sentence format, and link information can be output or written in sentences.

The basic sentence rules are rules for basic sentence structures. For example, if the sentence is in the form of "Noun Verb", and the verb is an intransitive verb, then the sentence is a complete sentence.

Sentence construction rules are rules for constructing sentences. For example, if we know the value of an attribute of a noun, then we can construct the sentence as "The (attribute) of the (noun) is (value)."

Sentence dissection rules are rules for dissecting sentences. For example, for sentences other than basic sentences, sentence dissection rules can be used to find the corresponding basic sentence structure. The sentence dissection rules divide words, and group words together. Basically, sentences are divided first by conjunction words, or verbs, then by preposition words, the articles, then probably nouns or pronouns. By finding the key structure words of the sentence, and the relationship of other words with the key structure words, any sentence can be transformed into basic sentence structure, thus simplify the process of language analysis by eliminating the need of numerous sample sentences.

Special rules that correspond to specific function words or word phrases are often related to a few words or phrases such as conjunctional words, and preposition words. For example, the word "because" indicates the reason or condition of the occurrence, and the combination "if" and "then" indicates the link between the first sentence and the second sentence.

The inputting rules, the reading rules, the thinking rules, the writing rules, the memorizing rules, the outputting rules, the inquiring rules, the verification rules, and the system update rules all comprise rules that will direct the corresponding processes of the inputting mode, the reading mode, the thinking mode, the writing mode, the memorizing mode, the outputting mode, the inquiring mode, the verification mode, and the system update mode. Similar to the internal control rules, they are files that contain commands that will be triggered by corresponding conditions.

For example, the inputting rules may comprise rules that identify the types of inputs and send the information to the executing system so that the executing system can respond to the type of inputs according to the basic rules.

If the internal control mechanism 410 detects input information from the inputting devices of the information gathering system, the inputting mode 420 will be activated according to the internal control rules. According to the inputting rules, the inputting mode 420 takes input information from inputting devices of the information gathering system, such as key board, microphone, internet site, and other inputting devices and converts the input information into format that can be read by the executing system 194.

The reading mode 430 processes information received from inputting devices and converted by inputting mode 420. Preferably, the reading mode 430 comprise word processing 431, and other information processing. For word processing 431, one default language can be set, and can be overwritten by inputting information. For word processing 431, the information preferably will be divided into sentences by specified sentence dividing mark, or symbolized either by combination of period (or question mark, exclamation point, etc.), space and capital letter, or by other symbols. In reading the sentences, each word in the sentences will be identified by searching and locating the corresponding element file of each word or phrase in the knowledge structure according to the file organizing mechanism, then the element files will be loaded to a temporary location easily accessible by the executing system 194.

For word input, in thinking mode, the executing system 194 will read information from identification files of the element files and find out whether the word is a noun, a verb, a pronoun, etc. The executing system 194 contains standard sentence formats in the structure rules that can be compared with input sentences. By comparing the sentence format, the input sentences can be divided into three types, a statement, a command or a question. A statement basically provides new information to establish new links. A command demands action. A question usually presents a problem that needs to be solved. For a sentence that is a statement, the executing system 194 will further identify the sentence format to determine what link the sentence is creating.

A sentence usually contains subject and predicate. In general, there are about five basic sentence structures. The subjects of the sentences are similar, consisting only of a noun and an article or marker. But each predicate is different because the relation between the verb and the remaining words is different. In the first sentence structure, the predicate consists only of the verb, which is called intransitive verb. This type of sentence usually indicates the actions the entity presented by the noun takes. At least in mostly cases, reading the element file for the verb, especially the fourth identification value 2114, the type of the sentence structure can be determined. The fifth identification value 2115 can be used to verify the sentence structure. Then the third link information file 2123 will provide more detailed and specific sentence structures related to the verb, including any indication of conditions such as where, when, why, who and how. Comparing the input sentence with the specific sentence structure, any missing parts can trigger inquiry mode 480 to request missing information. If no information is missing, from information from the first link information file 2121, the second link information file 2122, the fourth link information file 2124 and the fifth link information file 2125, other information can be obtained as the causes of the action or the results of the action indicated in the input sentence, thus new links can be created such as new conditions and occurrences related to the subject or new subjects.

In the second sentence structure, the predicate consists of a verb followed by a noun. The noun completes the meaning of the verb by identifying who or what receives the action of the verb. This noun is a direct object. Verbs that require direct objects to complete their meaning are called transitive. This type of sentences usually indicates the changes of the noun in the object because of the action took by the noun in the subject. Reading the element file for the verb, especially the fourth identification value 2114, the type of the sentence structure can be confirmed. The fifth identification value 2115 can be used to verify the sentence structure. Then the third link information file 2123 will provide more detailed and specific sentence structures related to the verb, including any indication of conditions such as where, when, why, who and how. Comparing the input sentence with the specific sentence structure, any missing parts can trigger inquiry mode 480 to request missing information. If no information is missing, from information from the first link information file 2121, the second link information file 2122, the fourth link information file 2124 and the fifth link information file 2125, other information can be obtained as the causes of the action or the results of the action indicated in the input sentence, thus new links can be created such as new conditions and occurrences related to the subject, object or new subjects, or new objects.

In the third sentence structure, the predicate also consists of a verb followed by a single noun. But here the verb serves merely to introduce a word that renames or describes the subject. The noun following the verb in this kind of sentence is a subject complement, or a predicate noun. Verbs in this pattern are called linking verbs because they link their subjects to the description that follows. The subject complements in this sentence pattern may also be adjectives. Adjectives serving as complements are often called predicate adjectives. By reading the element file for the verb, especially the fourth identification value 2114, the type of the sentence structure can be determined. The fifth identification value 2115 can be used to verify the sentence structure. Then the third link information file 2123 will provide more detailed and specific sentence structures related to the verb, including any indication of conditions such as where, when, why, who and how. Comparing the input sentence with the specific sentence structure, any missing parts can trigger inquiry mode 480 to request missing information. This type of sentences usually establishes the links between the two nouns in the sentences, the noun as subject complement is more general than the noun as the subject. In this case, the first link information file 2121, and the second link information file 2122, or sometime the third link information file 2123 of the two nouns can be updated. The adjectives usually provide values for the attributes of the nouns. In this case, the sixth link information file 2126 or eighth link information file 2128 of the noun may be updated adding the adjective to the attribute value.

In the fourth sentence structure, the predicate consists of a verb followed by two nouns. The second noun is a direct object, the first noun is an indirect object, identifying to or from whom or what the action of the verb is performed. This type of sentences usually means the exchange of an item, information from the noun of the subjective to the noun of the indirect object. By reading the element file for the verb, especially the fourth identification valve 2114, the type of the sentence structure can be verified. The fifth identification value 2115 can also be used to confirm the sentence structure. Then the third link information file 2123 will provide more detailed and specific sentence structures related to the verb, including any indication of conditions such as where, when, why, who and how. Comparing the input sentence with the specific sentence structure, any missing parts can trigger inquiry mode 480 to request missing information. The information in this sentence can be used either to update the sixth link information file 2126 for noun of the subjective and the noun of the indirect object, or to obtain information such as the causes of the actions or the result of the action from the fourth link information file 2124 and the fifth link information file 2125 of the verb with the help of information from the first link information file 2121, the second link information file 2122 of the nouns and verbs.

In the fifth sentence structure, the predict also consists of a verb followed by two nouns. But in this pattern the first noun is a direct object and the second noun (object complement) renames or describes it. This type of sentences usually means that the noun as the direct object has direct link with the noun as object complement. Usually the noun as object complement is more general than the noun as the direct object. The complicity of this type of sentences is that it also indicates the noun in the subject is the cause or reason that the link between the direct object and the object complement exists. This might make the link more contingent, therefore the link more likely become conditional link.

All sentences can be reduced to the five basic sentence structures by grouping the words in the sentences. For example, subjects, or objects of the sentences can be nouns, nouns phrases, or other words, or phrases that are functioning as nouns. Sentences may also contain more than one verbs either because there are auxiliary verbs in the sentences, or there are clauses in the sentences, wherein the clauses usually function as subjects, objects, or adjectives or adverbs. Using analyzing process, all sentences can be reduced to basic sentence structure, and the subject words of the sentences can be obtained by analyzing the basic sentence structure. The analyzing process for reducing sentences to basic sentence structure basically is a process for finding function words, or equivalent words. For example, the previous sentence "The analyzing process for reducing sentences to basic sentence structure basically is a process for finding function words, or equivalent words" contains only one verb "is". Therefore, it can be reduced to the third basic sentence structure. The word group before "is" contains the subject, and the word group after "is" contains the object. The word group "The analyzing process for reducing sentences to basic sentence structure basically" can be one or more group. The word group "a process for finding function words, or equivalent words" can be one or more group. Here, the word "basically" is an adverb, so it defines a verb. By proximity, it defines "is". The word "for" requires a noun, or a word or phrase functioning as a noun.

The phrase "reducing sentences" functioning as a noun and "reducing" pair with word such as "to", and the word "to" requires a noun, or a word or phrase functioning as a noun, wherein "basic sentence structure" is a noun phrase. Therefore, the phrase "for reducing sentences to basic sentence structure" define the phrase "The analyzing process", and the word "the" indicates that it define a noun or noun phrase, thus "analyzing process" is a noun phrase, and the center word of this word group is "process", where the word "analyzing" define the "process" broadly, and the phrase "for reducing sentences to basic sentence structure" define the "analyzing process" more narrowly. In the same way, the phrase for "finding function words, or equivalent words" defines the word "process". Therefore, the basic sentence structure is "The process(1) is a process(2)". Although this exercise might seem pointless, obtaining the basic sentence structure, obtaining center words, and obtaining the relationship of the defining words and phrases with the center words are important for conducting summarization (for content abstracts, or obtaining subject words), translation, and word searches, and even for building knowledge structure.

For example, in this instant example, the basic sentence structure "The process(1) is a process(2)" established the link between the process(1) and the process(2). Abstract nouns such as "process" are not further indicated by proper nouns, thus particular "process" is further defined by additional words or phrases. Therefore, an element file for process(1), and process (2) can be established that the link between process(1) and process(2) can be indicated either in the second link information file for each element, or in the sixth link information file for each element, or in both. Further, since the center word in this particular example is for a process, this sentence can also be used to establish a process file for "the analyzing process for reducing sentences to basic sentence structure" provided that the process file for the "process for finding function words, or equivalent words" exists.

Meanwhile, for content summarization or subject word summarization purpose, the "analyzing process for reducing sentences to basic sentence structure" and the "process for finding function words, or equivalent words" can each be treated as element, and depending on the relationship of these elements with other words or phrase, either of them could be key content phrase or subject word phrase.

The benefit of this analysis for translation purpose is more obvious. In different languages, the structure (or the sequence of the structure) of the sentence may be different, and the word sequence in the phrase may also be different. Thus, for words with similar meaning in different languages that have similar relationship with other words, the sequences of the phrases and the structures of sentences may be different. Using analyzing method of the present invention, the complicated relationships between words are peeled down one step at a time into more manageable level. Thus the conversion between different languages can first be done in the basic sentence structure level and then gradually completed in each phrase and word group. For example, in this instance, the basic sentence structure "The process(1) is process(2)" may directly correspond to a basic sentence structure in a different language where the predicts are prior to subject in the sentence structure, thus we have the equivalent of "Is process(2) the process(1)". If provided in this language the equivalent of adverb "basically" should be following the equivalent of the word "is", then the equivalent sentence would be "Is basically process(2) the process(1)". We can continue to use each specific rule for constructing the phrases that compose "process(1)" and "process(2)" until the entire sentence is translated in the sequence that follows the grammar rules of the particular language.

If the task of the process is to search information from the document structure according to the input information, in one preferred embodiment of the present invention, the purpose of sentence analysis is to find subject word (or phrase) and feature words (or phrases) for conducting the search. Often, the input for conducting the search is not in complete sentence format, but in word groups, mostly noun phrases, then the analysis would be focus on finding the proper noun (or central noun) and relationship of other words with the proper noun (or central noun).

If the thinking mode 450 established links between the existing elements, the information obtained from the thinking mode will be saved in a temporary status by memorizing mode 460, and then the executing system 194 will read the next sentence. If the thinking system is given a problem to solve, or a task to perform, one or more sentences could be command or question sentence. The command or question sentence can be detected in a few ways. For example, if a sentence starts with the word "do", "is", "have", etc., or interrogative pronouns, and ends with a question mark, then the sentence is a question sentences. If a sentence starts will a verb without a subject in front, then the sentence could be a command sentence. The tasks can also be inputted by specified ways that can trigger the required act by the internal control mechanism 410 of the executing system 194.

Sentences could have other words or phrases that usually indicate where, when, why, who and how. Compound sentences are more than one basic sentences usually marked by conjunctions. Compound sentences can either provide the conditions or results of the links, or provide attributes for processes. The thinking mode 440 should be able to detect the words that indicating the functions and sentence structures according to the information in the element files.

In reading sentences, tracking the relationship between pronouns and related nouns could be accomplished by trial and error. A pronoun replaces a noun that appears prior to the pronoun. When more than one noun appear before the pronoun that can be replaced by the pronoun, these nouns can be placed in the position of the pronoun in the sentence. Usually the meaning of the nouns will indicate which one is in right place in cooperation with the sentence. If uncertainty arises, the internal control mechanism can either enact inquiry mode 480, or provide alternative output based on different assumptions.

The common questions and tasks include the quests for values, verifications, etc. First, the sentence will be read as for the statement sentence, identify each word, searching, locating element file of each word, and determine whether the word is a noun, verb, pronoun, etc. The basic approach for solving a problem is to first identify what is the critical word or words according to the sentence structure, i.e., what the question or task calls for, then read the element file of the critical words, through links in the element file to find other words related to the critical words. Each word will be compared with the words in the element files in the temporary elevated status (element files in the knowledge structure related to input information that are loaded to areas easily accessible by the executing system), until a match occurs. If no match was found, the executing system will locate the element files of the words related to the critical words and search the contents of the these element files to find more related words to the critical words. Meanwhile the executing system will locate and elevate element files of the words that are in the contents of the element files that is in the temporary elevated status, to the temporary elevated status as well, and then the words related to the critical words will be compared to the contents of the newly elevated element files, to find a match. The process can be continue until all related element files have been compared and a match is found, or controlled by external interruption or internal control. If no match can be found, the executing system 194 will make inquires about missing link. This process basically traces the links of the critical words and the given words, until there is a cross point where link can be established.

When thinking mode 440 is put into action by internal control mechanism 410 according to the internal control rules, not triggered by input information, the thinking mode 440 can make new direct links between existing elements according to the information in the existing element files, or make new link process files according to the existing link process files and information in the existing element files. According to the internal control rules, the internal control mechanism 410 can also try to make assumptions such as providing hypothetical tasks imitating the real life tasks and try to complete the tasks so that to obtain new direct links and new link process files.

If no expressed task has been given, the input information can be evaluated to determine if any action, reaction or other system operation need to be taken, based on the internal control rules of the internal control mechanism.

In one preferred embodiment of the present invention, in the process for analyzing input words in order to obtain subject word (or phrase) and feature words for search purpose, the thinking mode first reads the first identification file of each element file. If the first identification file indicates that the element file is for a language element, a word processing mode will be activated, and the thinking mode will go on to read the second identification file of the element file. If the second identification file indicates that the element file is for an English word or phrase, an English processing mode will be activated, and the thinking mode will go on to read the third identification file of the element file. If the third identification file indicates that the element file is for a noun, the thinking mode will return the reading value to the executing system for future use, and thinking mode will go on to read the fourth identification file of the element file. If the fourth identification file indicates that the element file is for a common noun, the thinking mode will return the reading value to the executing system for future use, and thinking mode will go on to read the fifth identification file of the element file. If the fifth linking file indicates that the element file is for a single noun, the thinking mode will return the reading value to the executing system for future use, and thinking mode will go on to read the sixth identification file of the element file. If the sixth identification file indicates that the element file is for a noun for an entity, the thinking mode will return the reading value to the executing system for future use, and thinking mode will go on to read other element files. The thinking mode will stop reading the element files and start analysis the information from the element files after reading certain symbols, such as the symbol for period or return key input. If the task called for conducting a search, the thinking mode will analysis the reading values from the element files. In language processing mode, the reading value of the third linking file of each element will first be collected. The thinking mode will first look for the reading value for verbs, and if one verb or verbal is found in the input segment, it may be assumed that the segment is a sentence or sentence like segment, and the segment will be analyzed using sentence structure rules. If only one verb is found in this segment, the words before and after the verb will be grouped separately. The thinking mode will collect the reading values for the fourth identification files of the verbs in order to determine if the verb is a transitive verb, or intransitive verb.

If the segment is in sentence format, the word, or words before the verb will generally be noun, or word or phrases that functioning as noun, as the subject of the sentence. The word or words after the verb will be noun, or word or phrases that functioning as noun, as the object of the sentence, if the verb is a transitive verb. If the verb is a intransitive verb, the word or words will be adverb, or word or phrases that functioning as adverbs. From reading values of linking files of the element files, the sentence format can be verified and determined.

If more than one verbs are found, the thinking mode will collect the reading values for the fourth identification files of the verbs in order to find auxiliary verbs and main verb. For verbs that could be auxiliary verbs as well as substantive verbs, the location of the verbs in the segment will be looked at. For example if "do", "have" type of words are located at the first place of the segment, or follow words such as "who", "what", etc., then the verbs are likely to be auxiliary verbs and the segment would likely to be marked as question sentence. If there are more than one main verbs in the segment, then whether the verbs are transitive verbs will be examined. If transitive verbs are missing objects, then other verbs may be verbs for the clauses that are objects of the transitive verbs. By this means, the main verb will be determined, and the basic sentence structure will also be obtained.

Generally speaking, one purpose of analyzing the segment or sentence is to determine the subject word (especially for the task of conducting searches). Just about all subject words can be categorized as who, what, where, when, and how. In the basic sentence structure, there is always one and only one subject word in each segment or sentence, and the subject word will always be nouns (or pronouns). If the subject word is a proper noun, it will generally be about people or entity (for the who or what of a sentence). Since proper nouns intend to point to particular persons or entities having unique attributes, while in reality one particular proper noun often represents more than one persons or entities, specific values of certain attributes are often provided to make the distinctions. For example, there might be many John Smith, and they may be differentiated by profession, where they live, age, etc. Therefore, if the task is to conduct a search in the document structure, if the input is in a sentence wherein the subject word (or phrase) is a proper noun, the sentence could provide a particular value to an identifying attribute so that to further define the subject word.

If the subject word (or phrase) is a common noun, the sentence that provides the additional information about the subject word can be treated as a process file, as the information can be applied to all persons or entities that can be described by the common noun. For the purpose of performing the search task, it could be used to find all persons or entities that are defined by the subject and sentence. There might be cases that the users want to obtain general knowledge about the subject words as defined by the sentences, then documents having corresponding subject words and feature words should be found. However, in Internet environment, these documents are relatively rare, there might only be a handle of sites that solely devote to general information about certain subjects. Occasionally, websites providing information for certain persons or entities may also some general information, then careful process of the document contents may be required to establish corresponding subject word files for these subjects.

If the subject word (or phrase) is an abstract noun, the sentence that provides the additional information about the subject word can be used to define the subject word. For purpose of conducting a search, the additional information can be used either to generate new subject word (phrase), or as feature words. Similar to the common nouns, documents that contain general information about certain abstract nouns (or phrases) can be found by using corresponding subject words and feature words. In Internet environment, these document contents mostly related to particular types of sites, such as news, publishing, educational, informational, etc. For these types of documents, careful processing is needed.

For the task of conducting a search, if the input in the statement sentence format does further define the subject word, then the sentence as a whole can be treated as a subject for conducting the search.

If the task is to conducting a search, often the input information is not in sentence format. The users often input a few criteria for conducting the search in one or more word group. And for the most time, the input information is one or more noun phrases.

For a noun phrase, or an input segment with several nouns, the nouns representing the people or entity (for the who and what) will often be the subject words, of which proper nouns will more likely be the subject words than the common nouns. For example, if a user enter search query "'Chaya', 'restaurant', 'Los Angeles'", then "Chaya" would be the subject word for this segment, and "restaurant" and "Los Angeles" as the feature words, as "restaurant" will provide value for attribute business type of "Chaya", and "Los Angeles" will provide value for attribute location of "Chaya".

The noun phrases in the sentences can often be expressed with the element files of the subject words. For example, the search query "'Chaya', 'restaurant', 'Los Angeles'" can establish an element file for "Chaya" wherein the value for the attribute "business type" will be "restaurant", and the value for the attribute "location" will be "Los Angeles".

When a word (or a phrase) is not found in the knowledge structure, is can be assumed that it is a name for either a person, or a place. Then other words can be used to indicate what kind of word it is. For example, if there is no "Chaya" element file in the knowledge structure, then for the search query "'Chaya', 'restaurant', 'Los Angeles'", the common noun "restaurant" can be assumed to define "Chaya", thus "Chaya" is assumed as the name for a restaurant, thus a proper noun for an entity, and to be used as subject word for the search, wherein "restaurant" can be used as the value for attribute "business type", and "Los Angeles" as the value for attribute "location" of this subject word. Thus the search would be to find a subject word file that the value of the attribute "business type" is "restaurant", and the value of the attribute "location" is "Los Angeles".

The information obtained from the thinking mode 440 can first be expressed in sentences by the writing mode 450. For an answer to a question, the word directly links to the critical word usually replace the critical word in the question sentence, and the sentence is transformed into a statement sentence. For different task, the way of writing may be different, it is basically placing relevant words in sentence formats determined by the executing system 194 according to the structure rules.

The sentences from writing mode can be delivered to output device by outputting mode 470, wherein they can be displayed to the user or control some devices.

In a preferred embodiment of the present invention, if the thinking mode 450 established links between the existing elements, once the success links are established, the routes for making the link are identified and saved by the memorizing mode 460. This information can be saved in a preferred process file of the process file structure, wherein the element files of the given words and critical words, and important link words will contain information referring to this process file. The process file can be identified by the given words, critical words, and/or important link words.

The preferred process file can be generalized and expended to provide more link route by thinking mode 440. When the process file structure is established, the problem solving process may start with search the process file structure for process file that matches the given words and critical words of the problem. This will save time and effort.

In a preferred embodiment, the entire process of the executing system may be document and identified by contents and time of execution by memorizing mode 460 as a system log file, and can be used for verification, generalization, and expansion of the process file, and any other purposes.

The outputting mode of the internal control mechanism controls output devices to write word output to display devices, or to output sound output to speakers.

The inquiry mode 480 inquiry information either from document structure, outside sources, or human operators. Technically, the document structure does not need to be part of the thinking system, but the operation of the document structure must be compatible with the thinking system. When information is requested and inquiry mode is called for, the information in the document structure can be first searched, if no answer is found, the inquiry rules will decide whether to request information from other sources or the human operators. But sometimes it is obvious that the information cannot be found in the document structure, thus the inquiry rules will first determine where to request the information from.

When the inquiry rules lead to the document structure to search for the information, the process is basically a search process, therefore the inquiry rules will include searching rules. Depending on the types of document structures, the searching rules might be a little different.

When the system of the present invention is used for document search purpose, there is difference between the system of the present invention and the ordinary "search engines". As the system of the present invention can "think", and "understand" the meaning of the language, the inputs for the purpose of conducting document searches could be different from the ordinary searches. When using the system of the present invention, the inputs can be in conversation style, or any other style, and the key is to be specific.

In fact, the ordinary uses of the search engines often have two different purposes, one is for finding information, and another is for finding a particular document or type of documents. For the first purpose, there might not be a need for conducting the document search in the document structure, because the system might be able to find the information from the knowledge structure by using thinking mode, thus the process will simply be a problem solving, or question-answer process. Only when no answer can be found in the knowledge structure, the inquiry mode will need to be operated to conduct the search in the document structure. Before the inquiry mode is called for, the system of the present invention will go through the inputting mode, the reading mode, the thinking mode, and the input information will be analyzed. Thus certain search criteria such as subject words and feature words can be obtained for conducting the search. Further, information (links) in the element files for words in the question along with the words in the question will be used to conduct searches in the document structure.

In one preferred embodiment of the present invention, when the task calls for obtaining information based on the input terms (performing search function), the thinking process will first analyze the input information, wherein information in the element files of the input information will be used. And, according to the identification information of the element files and the linking information of the element files, subject words and feature words will be obtained for conducting searches in the document structure. The purpose of the analysis is to find subject words (or phrases), and feature words (or phrases), and most likely subject words will be nouns, while feature words will have relationship with the subject words.

For example, if the user input is "'Chaya', 'restaurant', 'Los Angeles'", the thinking mode will first identify that there are three terms, that are all nouns (using the third identifying information of the respected element file), wherein "Chaya" and "Los Angeles" are proper nouns (using the fifth identifying information of the respected element file), and "restaurant" is a common noun (using the fifth identifying information of the element file for "restaurant"); then the thinking mode will identify that "Chaya" and "restaurant" are nouns for entities (using the sixth identifying information of the respected element file), and "Los Angles" is a noun phrase for location (using the sixth identifying information of the respected element file).

Generally speaking, subject words mostly likely would be proper nouns that indicate persons, or entities. Although name for a location such as "Los Angeles" could be a subject word for identifying an entity, generally speaking it will be a value for the attribute "location" for the subject word. Also, generally one search query only has one subject word, thus, in this case, the word "Chaya" that is a proper noun for an entity will be selected as subject word. From the element file of "Chaya", we can find attribute "business type", and "location", where the word "restaurant" can be the value of "business type", and the phrase "Los Angeles" can the value of "location". Therefore, search query will be for subject word file "Chaya" where the value for attribute "type" is "restaurant" and the value for the attribute "location" is "Los Angeles".

However, if a word element file exists for "Chaya" that is a restaurant in Los Angeles, then there might be enough information in the element file, that there might not be needs to search the document structure. What might actually happen is there is no word element file for "Chaya". In this case, the search in the document structure must be done, and the analysis prior to the search will concentrate on "restaurant" and "Los Angeles". As we know (from the analysis as illustrated above) that "restaurant" is a common noun that indicates the type of entity, and "Los Angles" is a proper noun phrase that could indicate the location of an entity. We can generally assume that searches often are about finding some specific thing (one thing at a time), and we can assume that there should be some relationship between these search terms, assuming the first search term "Chaya" is a noun (as the knowledge structure would likely to miss some names for places, entities, or persons than lack of verbs, adjective, etc.), the logically thing is that "Chaya" is proper noun that indicates an entity. Thus, the search query again will be provide with "Chaya" as subject words, and "restaurant" and "Los Angeles" as feature words (as from the seventh link file of the respected word, "restaurant" is a value for attribute "business type" of an entity and "Los Angeles" as a value for attribute "location" of an entity.

If there is no subject word file that matches "Chaya", two steps can be taken. First, the searches can be extended to subject word (phrase) files that contain the word "Chaya". Then, there might be subject phrase files such as "Chaya Venice", "Chaya Brasserie" that has "restaurant" and "Los Angeles" as respected value for respected attribute. Next, in the case that if there is an element file for the word "Chaya", we can look into the element file and obtain words (or phrases) with similar meanings and words that are more narrow in meaning (or even more broad in meaning), and use these words as subject words (along with the feature words) to conduct a new search.

Similarly, if there is one or more subject word file "Chaya", but the values of the attributes "business type" of which are not "restaurant", or the values of the attributes "location" are not "Los Angeles", we can look into the element files for "restaurant" or "Los Angeles", and obtain words (or phrases) with similar meanings, and words that are more broad and more narrow in meaning, and use these words as key words to conduct a new search. In this case, "Chaya Venice" is in Venice, and "Chaya Brasserie" is in Beverly Hills, that in broader sense are part of Los Angeles, therefore, the results can be given.

If after all the above proceeding, there is still no match, then it seems that there is no document that dedicated to the restaurant "Chaya" in Los Angeles. However, there might be other documents that contain information about the restaurant Chaya in Los Angeles, for example, the websites that list the name and basic information about restaurants in Los Angeles area. For this type of documents, we can use index word files to categorize them. For example, the index word file for the documents that list the information of the restaurants that located in Los Angeles could be expressed as index(restaurant, Los Angeles), or index(type=restaurant, location=Los Angeles). Like the subject word file, there may be many index word files with the same name, that correspond to different documents (that has different document addresses). The search here is different from using the subject word files. For example, the search process will first find the index word file wherein type=restaurant, and location=Los Angeles, then from the list of name of entity within these files, find an entity name (key word) that is Chaya or similar name, and obtain other information related to this entity.

Otherwise, there might also be other documents that contain the word Chaya but here Chaya is not the subject word of the documents but a feature word (or simply an attribute) in the documents. If there is a website about the chef of Chaya, wherein it mentioned that the Chef works in a restaurant called Chaya, and the Chef lives in Los Angeles. This website can be obtained by using "Chaya", as well as "restaurant" and "Los Angeles" as feature words to search in all subject word files. Since this website may be helpful for the user, the information about this website can be provided to the user.

The search terms can be inputted in a sentence like structure, whereas the sentence needs to be analyzed to obtain subject words, and feature words. For example, the user may input search requirement such as: "Please find information about Chaya, a restaurant in Los Angeles." This sentence can be reduced to the second basic sentence wherein the basic structure is "find information". Since "find" equals to "search for", the basic structure provide a command for the thinking system. By structure analysis, "in Los Angeles" define "restaurant", "a restaurant in Los Angeles" define Chaya, and "about Chaya, a restaurant in Los Angeles" define "information". However, since the word "information" is an abstract word (which is descriptive), in meaning the descriptive abstract word define the aspect of Chaya, and the meaning of the word "information" can be interrupted here as "all attributes of". Thus the task for the thinking system is to find all attributes of "Chaya", and "restaurant" and "Los Angeles" are used to distinguish this "Chaya" with all other "Chaya"s. Here we can see the reason for a proper noun to be further defined is that the proper noun might not be for one particular entity, or person. Here we can also see in reality, the analysis of the words based on sentence structure analysis does not determine the final outcome in determining which word is the subject word of the sentence. Ultimately subject words will likely be proper nouns that points to particular persons or entities.

The subject word file could also be about a person, as well as an entity. There are also other types of documents the contents of which are not about entities, nor persons. For example, the document could be about a process, a concept, a theory, or a discussion, etc. The subject word files for these types of documents would not be a proper noun representing an entity, but the name (usually an abstract noun) of the process, the concept, the theory, the discussion, or the case, etc. However, if the purpose of the search is to find a document that is about a process, a concept, a theory, a discussion, or a case, etc., the analysis process is simple. Abstract nouns usually are at least less multi-dimensional comparing to proper nouns. Thus, instead of using proper noun to indicate a particular, often multiple words are combined to indicate a specific, and most of the time this specific is one and only. Therefore, the subject word (phrase) file searches only need to use the name of the subject phrase to conduct the search. However, since the subject phrase is a combination, and similar words can be used to compose the combination, the names of the subject phrases can be expressed in ways that are flexible to the exchange of particular words or sequences. Usually, this type of subject phrases will have a center word (a abstract noun, etc.), and other words in the phrase are often adjectives, or nouns that are more descriptive than the center word. For example, the subject phrase "modern American literature" can be expressed as "literature/modern/American", wherein "literature" is the center of the subject phrase, and the position of "modern", and "American" with each other and with the center can be interchangeable (often with the help of preposition words), wherein "literature", "modern", and "American" can be replaced with words of similar meaning. All possible combination of the words in the expression will have similar meaning, thus when user inputted terms are in one form of the combination, the search results could return all the combination with similar meanings.

For some special documents, such as legal cases, the names for the subject word files may be case names or alternatively citation names, but often for the purpose of the search, feature words are more important, and there might be specific relationship between feature words that will be particular helpful for obtaining the intended documents. For example, in legal research, there are legal issues, sub-issues and applicable defenses related to the issues. As US legal system emphases precedents, finding cases that contain the particular relationship between legal issues, sub-issues, applicable defenses and defenses to the defenses are very important. Therefore, the feature words can be structured by legal issues, sub-issues, applicable defenses, and defenses to the defenses.

In one preferred embodiment of the present invention, the contents of the subject word file contain feature issue words that are corresponding to legal subjects, wherein each feature issue word are further connected to feature sub-issue words, and subsequently the feature sub-issue words may be connected with feature defense words, and feature defense words with feature defense to defense words, and so. Meanwhile, each feature word may have word with similar meaning, thus when conducting the search, the search term will be a sequence of words where word with similar meaning for each of the word in the sequence can be used.

For example, according to the law of civil procedure, there is an equitable defense "forum non conveniens" against suit filed in the jurisdiction, if a user want to find out whether there is an equitable defense "unclean hands" that has been used as a defense against the defense of "forum non conveniens", the key word structure can be helpful. In this instance, one of the feature word (phrase) sequence for the search sequence will be "civil procedure(cause of actions(-forum non conveniens (-unclean hands)))". Using this search method, only cases dealing with these particular issues and defenses will be found. The type of feature word sequence can also be used for other types of documents that contain feature words having specially relationships.

Generally speaking, most words can be feature words, although feature words are often nouns or noun phrases. The feature words must somehow linked to the subject words, but ordinary there are no specific requirements regarding the types of links. The most important principle is what would help to find the specific information and documents that the users are searching for. For example, for businesses, the kinds of products or services would be important features. However, when establishing the subject word (or phrase) file, the feature words for the products or services may not be detailed as the users required. For example, a subject word file for a store may have the names of the products as feature words, but do not have information regarding specific information about the products, such as models, sizes, etc. In this case, the system of the present invention may first obtain the subject word files that have the products according to the feature words (product names), and then read the document contents to find the specific information that matches with the criteria that the user required and return the final results to the user. Further, using the feature word sequences (as indicated above), other information such as prices can also be found.

The system of present invention can be further used to obtain information and expand the communication capacities of the users. For example, if the price for certain product is not listed in the store website, or the price is not what the user can accept, the user can set up a bidding process with the help of the system of the present invention by contact stores that have the products and either asks them whether any one will accept certain price, or ask them to submit the best price in a set time frame. Similarly, if the products available at websites of all the stores do not meet the users requirement, the user can sent an inquiry with specific requirement for the product for stores (or plants) with the similar products and ask them to respond with price quote in certain time frame.

In one preferred embodiment of the present invention, the searches in the document structure are done by searching the document entry files that the category words are the file names. Once the document entry files are obtained according to the category words, addresses of the documents that correspond to the category words can be obtained, thus the contents of the documents can be retrieved according to the document addresses. The document contents obtained from the document structure will be processed by the system of the present invention by going through reading mode, thinking mode, wherein information required to answer the question inputted by the user will be analyzed, organized (and verified if more than one document sources are available), and presented in a proper form. Such saving the user time and effort, and provide better results.

For example, in the embodiment where the document entry file names are key words, the input information will be processed by reading mode and thinking mode, and from the knowledge structure of the present invention, words of similar meanings and words of more general meanings of the words in inputs can be obtained. Thus, the documents that contain key words that are with similar meanings, or more general meanings (or more specific meanings) can all be found by the key word searches conducted by the executing system with the helps of the document organizing mechanism. For example, a document on a website may contain information about oranges that contain high Vitamin C substance. Thus the key words for this website may include oranges, Vitamin C, etc. If the user is making an inquire about the nutrition values of fruits, or how to eat healthy, the method of search of the present invention may be able to find the website and provide related information to the user even if this website does not contain the words "fruit", "food", "nutrition values" and "healthy", because the key words searches can be expanded to include "oranges", "Vitamin C", etc.

For the purpose of finding a document that is located in the document structure, the system of the present invention will still go through inputting mode, reading mode, thinking mode, before inquiry mode is called for, and the input will be analyzed before the inquiry mode. As the system of the present invention is able to understand to meaning of the request, the user can specify in detail the type of documents that he or she is searching for, and the system of the present invention will use this information not only in searching for the documents, but also in reviewing the documents to the specific document (or documents) that meets the request. For example, in the embodiment where the document structure is organized by categories and subcategories, the system of the present invention can use reading mode and thinking mode to process the user request to obtain the information regarding the categories and subcategories that the documents that meet the request may belong to, and use the inquiry mode to search the categories and subcategories of the document structure, and process the documents obtained by the search in reading mode and thinking mode, until one or more specific match is found. If no match is found, the search can be expended for words with similar or more general (or specific) meaning of the related words. The expansion of word categories can continue with all links with the related words until the specific document (or documents) is found.

In a preferred embodiment, the new link information obtained from generalizations or inductions by thinking mode 440 memorizing mode 460 can be verified by verification mode 490, and to be used to update the related element files.

In a preferred embodiment, the operating process of the executing system 194 can be saved according to operating time of the executing system 194 and related element files and link process files to system log files in the system log. The system log files can be used for many purposes. They will be especially useful when certain direct links in certain element files need to be revised, for the system log files can provide the records of changes to other element files or link process files in the past based on those direct link information and revise other element files or link process files.

The verifying, generalizing, expending capabilities are part of the special features of the system of the present invention, whereby the system of the present invention is more self-sufficient, self-learning, and progressive. Combined with feature of inquires, and self-controlled operating capacities, the present invention will be able to expand the knowledge structure, process structure with little exterior assistance once the basic structures are established. Because the system of the present invention not only can read and understand input information and perform related task, it can also learn and improve itself, it is truly intelligent.

In one preferred embodiment of the present invention, the system log is established similar to a document structure, thus search can be conducted to obtain information from the system log. For example, for thinking system being used for search purposes, information regarding the users and the user queries can be used to generate statistic analysis, for purposes such as market research.

What is claimed is:

1. A method for operating a computer system, comprising the steps of:
   (a) establishing a knowledge structure including a language file organizing mechanism, and more than one language element files, wherein the language element files include identifying information and knowledge information;
   (b) establishing an document structure,
   (c) wherein the document structure further comprises document entry files, document addresses, and document contents, and a document organizing mechanism;
   (d) wherein the document entry files further comprise subject terms and feature terms;
   (e) establishing an executing system comprising an internal control mechanism and an inputting mode, a reading mode, a thinking mode, a writing mode, a memorizing mode, an outputting mode, an inquiry mode, verification mode, and a system update mode;
   (f) wherein the internal control mechanism further comprises internal control rules and structure rules, wherein the internal control rules include basic rules, target rules, task rules;
   (g) establishing a system log;
   (h) running the executing system wherein the internal control mechanism can operate constantly, wherein the thinking mode, inquiry mode, memorizing mode, verification mode, and a system update mode can be activated according to the internal control rules of the internal control mechanism not triggered by an input;
   (i) if input information is to be received from an inputting device of a sensing and information gathering system, the internal control mechanism will operate inputting mode according to the internal control rules, wherein the input information will be converted to format conformed with the format requirement by the executing system according to the inputting rules, wherein information other than language may be converted to language information, or information other than language may be preprocessed by the information processing tools to prepare for further processing in the reading mode;
   (j) once input information is received by the executing system, the internal control mechanism will activate reading mode according to the internal control rules, wherein according to the reading rules, the input will be disseminated into elements and element files of the knowledge structure with corresponding elements matched with the input elements will be located and loaded into the executing system (or areas easily accessible by executing system) according to the file organizing mechanism of the knowledge structure;
   (k) if it is determined a specific task is called for, the internal control mechanism will activate the thinking mode, wherein according to the thinking rules designated by the internal control mechanism, the thinking mode can establish new direct links between the existing elements of the knowledge structure that match with the elements of the input information according to the input information;
   (l) wherein the new direct link between the first existing element and the second existing element can be saved to the element file of the first existing element and the element file of the second existing element by the memorizing mode according to the memorizing rule, wherein the linking process for linking the first existing element with the second existing element can be saved as a process file to a process structure by the memorizing mode according to the memorizing rule, wherein information including the new direct link between the first existing element and the second existing element can be written to a display device by the writing mode according to the writing rules and the structure rules of the internal control mechanism, wherein the new direct link between the first existing element and the second existing element can be converted to information other than language and outputted as control signal to output device by the outputting mode according to the outputting rule;
   (o) wherein the internal control mechanism can operate inquiry mode according to the internal control rules, wherein the inquiries can be sent to display device or output device to inquire information, or document structure, wherein the input information responding to the inquiries will be processed by inputting mode, reading mode, and thinking mode, and memorizing mode to establish new direct links between the existing elements, new direct links between new elements and existing elements of the knowledge structure, and new element files; and
   (p) if new links and/or new element files and/or new process files are established, the internal control mechanism can operate the verification mode to verify new direct links and the new linking processes; the internal control mechanism can also operate the system update mode to update the internal control rules, the structure rules, and the process files in the process structure, wherein the system operator's participations are often needed.

2. A method as claimed in claim 1, wherein the inputted information will be process to obtain subject terms and corresponding feature terms, wherein documents in the document structure including the subject terms and corresponding feature terms can be selected, and to be displayed according to other related features that are not search terms.

3. A computer system including one or more CPU's, one or more I/O devices, and one or more memories, comprising:
- a knowledge structure, a document structure, and an executing system, wherein the knowledge structure includes a language file organizing mechanism, and more than one language element files, wherein the language element files include identifying information and knowledge information;
- wherein the executing system comprising an internal control mechanism and an inputting mode, a reading mode, a thinking mode, a writing mode, a memorizing mode, an outputting mode, an inquiry mode, verification mode, and a system update mode;
- wherein the internal control mechanism further comprises internal control rules and structure rules, wherein the internal control rules include basic rules, target rules, task rules;
- wherein the internal control mechanism can operate constantly, wherein the thinking mode, inquiry mode, memorizing mode, verification mode, and a system update mode can be activated according to the internal control rules of the internal control mechanism not triggered by an input;
- if input information is to be received from an inputting device of a sensing and information gathering system, the internal control mechanism will operate inputting mode according to the internal control rules, wherein the input information will be converted to format conformed with the format requirement by the executing system according to the inputting rules, wherein information other than language may be converted to language information, or information other than language may be preprocessed by the information processing tools to prepare for further processing in the reading mode;
- once input information is received by the executing system, the internal control mechanism will activate reading mode according to the internal control rules, wherein according to the reading rules, the input will be disseminated into elements and element files of the knowledge structure with corresponding elements matched with the input elements will be located and loaded into the executing system (or areas easily accessible by executing system) according to the file organizing mechanism of the knowledge structure;
- if it is determined a specific task is called for, the internal control mechanism will activate the thinking mode, wherein according to the thinking rules designated by the internal control mechanism, the thinking mode can establish new direct links between the existing elements of the knowledge structure that match with the elements of the input information according to the input information;
- wherein the new direct link between the first existing element and the second existing element can be saved to the element file of the first existing element and the element file of the second existing element by the memorizing mode according to the memorizing rule, wherein the linking process for linking the first existing element with the second existing element can be saved as a process file to a process structure by the memorizing mode according to the memorizing rule, wherein information including the new direct link between the first existing element and the second existing element can be written to a display device by the writing mode according to the writing rules and the structure rules of the internal control mechanism, wherein the new direct link between the first existing element and the second existing element can be converted to information other than language and outputted as control signal to output device by the outputting mode according to the outputting rule;
- wherein the internal control mechanism can operate inquiry mode according to the internal control rules, wherein the inquiries can be sent to display device or output device to inquire information, or document structure, wherein the input information responding to the inquiries will be processed by inputting mode, reading mode, and thinking mode, and memorizing mode to establish new direct links between the existing elements, new direct links between new elements and existing elements of the knowledge structure, and new element files; and
- if new links and/or new element files and/or new process files are established, the internal control mechanism can operate the verification mode to verify new direct links and the new linking processes; the internal control mechanism can also operate the system update mode to update the internal control rules, the structure rules, and the process files in the process structure wherein the system operator's participations are often needed.

4. A system as claimed in claim 3, further comprising a process structure, and a system log.

5. A system as claimed in claim 4, wherein the document structure further comprises document entry files, document addresses, and document contents, and a document organizing mechanism.

6. A system as claimed in claim 5, wherein the document entry files comprise subject terms and corresponding feature terms, and the addresses of the documents having subject terms and corresponding feature terms.

7. A system as claimed in claim 5, wherein the document entry files comprise key terms, document names, and document addresses.

8. A system as claimed in claim 5, wherein the document entry files comprise content terms, document names, and document addresses.

9. A document structure system of a computer system including one or more CPU's, one or more I/O devices, and one or more memories, comprising:
- document entry files, document addresses, and document contents, and a document organizing mechanism;
- wherein the document structure system operating with a knowledge structure, and an executing system, wherein the knowledge structure includes a language file organizing mechanism, and more than one language element files, wherein the language element files include identifying information and knowledge information;
- wherein the executing system comprising an internal control mechanism and an inputting mode, a reading mode, a thinking mode, a writing mode, a memorizing mode, an outputting mode, an inquiry mode, verification mode, and a system update mode;
- wherein the internal control mechanism further comprises internal control rules and structure rules, wherein the internal control rules include basic rules, target rules, task rules;
- wherein the internal control mechanism can operate constantly, wherein the thinking mode, inquiry mode, memorizing mode, verification mode, and a system update mode can be activated according to the internal control rules of the internal control mechanism not triggered by an input;
- if input information is to be received from an inputting device of a sensing and information gathering system, the internal control mechanism will operate inputting mode according to the internal control rules, wherein the input information will be converted to format conformed with the format requirement by the executing system according to the inputting rules, wherein information other than language may be converted to language information, or information other than language may be pre-processed by the information processing tools to prepare for further processing in the reading mode;

once input information is received by the executing system, the internal control mechanism will activate reading mode according to the internal control rules, wherein according to the reading rules, the input will be disseminated into elements and element files of the knowledge structure with corresponding elements matched with the input elements will be located and loaded into the executing system (or areas easily accessible by executing system) according to the file organizing mechanism of the knowledge structure;

if it is determined a specific task is called for, the internal control mechanism will activate the thinking mode, wherein according to the thinking rules designated by the internal control mechanism, the thinking mode can establish new direct links between the existing elements of the knowledge structure that match with the elements of the input information according to the input information;

wherein the new direct link between the first existing element and the second existing element can be saved to the element file of the first existing element and the element file of the second existing element by the memorizing mode according to the memorizing rule, wherein the linking process for linking the first existing element with the second existing element can be saved as a process file to a process structure by the memorizing mode according to the memorizing rule, wherein information including the new direct link between the first existing element and the second existing element can be written to a display device by the writing mode according to the writing rules and the structure rules of the internal control mechanism, wherein the new direct link between the first existing element and the second existing element can be converted to information other than language and outputted as control signal to output device by the outputting mode according to the outputting rule;

wherein the internal control mechanism can operate inquiry mode according to the internal control rules, wherein the inquiries can be sent to display device or output device to inquire information, or document structure, wherein the input information responding to the inquiries will be processed by inputting mode, reading mode, and thinking mode, and memorizing mode to establish new direct links between the existing elements, new direct links between new elements and existing elements of the knowledge structure, and new element files; and if new links and/or new element files and/or new process files are established, the internal control mechanism can operate the verification mode to verify new direct links and the new linking processes; the internal control mechanism can also operate the system update mode to update the internal control rules, the structure rules, and the process files in the process structure, wherein the system operator's participations are often needed.

10. A system as claimed in claim 9, wherein the document entry files further comprise subject terms and corresponding feature terms, and the addresses of the documents having subject terms and corresponding feature terms.

11. A system as claimed in claim 10, wherein when searches are conducted within the document structure, the search terms can be divided into subject terms and corresponding feature terms.

12. A system as claimed in claim 11, wherein documents in the document structure including the subject terms and corresponding feature terms can be selected according to the subject terms and corresponding feature terms, and to be displayed according to other related features that are not search terms.

13. A system as claimed in claim 10, wherein the feature terms are labeled by the types of features they describe, and when searches are conducted within the document structure, the search terms can be divided into subject terms and corresponding feature terms and the type of feature they describe.

14. A system as claimed in claim 9, wherein the document entry files further comprise key terms, document names, and document addresses, wherein the key terms are the subjects of the documents.

15. A system as claimed in claim 9, wherein the document entry files further comprise content terms, document names, and document addresses, wherein the content terms includes subjects and features of the documents.

* * * * *